United States Patent
Chendamarai Kannan et al.

(10) Patent No.: US 10,454,559 B2
(45) Date of Patent: Oct. 22, 2019

(54) TECHNIQUES FOR SELECTING AN ANTENNA SUB-ARRAY AT A USER EQUIPMENT

(71) Applicant: QUALCOMM Incorporated, San Diego, CA (US)

(72) Inventors: Arumugam Chendamarai Kannan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/925,077

(22) Filed: Mar. 19, 2018

(65) Prior Publication Data

US 2018/0278320 A1   Sep. 27, 2018

Related U.S. Application Data

(60) Provisional application No. 62/476,464, filed on Mar. 24, 2017.

(51) Int. Cl.
| | | |
|---|---|---|
| *H04L 5/12* | (2006.01) | |
| *H04B 7/08* | (2006.01) | |
| *H04B 7/06* | (2006.01) | |
| *H04W 72/04* | (2009.01) | |
| *H04W 74/08* | (2009.01) | |

(52) U.S. Cl.
CPC ......... *H04B 7/0811* (2013.01); *H04B 7/0691* (2013.01); *H04B 7/082* (2013.01); *H04B 7/0868* (2013.01); *H04W 72/046* (2013.01); *H04W 74/0833* (2013.01)

(58) Field of Classification Search
CPC .... H04B 7/0811; H04B 7/0691; H04B 7/082; H04B 7/0868; H04W 72/046; H04W 74/0833
USPC ................................. 375/262, 261, 260, 259
See application file for complete search history.

(56) References Cited

U.S. PATENT DOCUMENTS

| | | |
|---|---|---|
| 9,332,508 B2 | 5/2016 | Gaal et al. |
| 9,379,789 B2 | 6/2016 | Lin et al. |
| 2014/0098689 A1 | 4/2014 | Lee et al. |
| 2015/0124900 A1 | 5/2015 | Shapira et al. |
| 2016/0127030 A1 | 5/2016 | Kim et al. |

(Continued)

*Primary Examiner* — Zewdu A Kassa
(74) *Attorney, Agent, or Firm* — Holland & Hart LLP

(57) ABSTRACT

Techniques are described for wireless communication at a user equipment (UE) having a plurality of antenna sub-arrays. One method includes performing an initial acquisition procedure with a base station using each antenna sub-array of a first subset of antenna sub-arrays, in which the first subset includes two or more antenna sub-arrays of the plurality of antenna sub-arrays; selecting an antenna sub-array from the first subset; and performing a random access procedure with the base station using the selected antenna sub-array. Another method includes performing a random access procedure with a base station using a first antenna sub-array in the plurality of antenna sub-arrays; selecting a second antenna sub-array in the plurality of antenna sub-arrays to use for communication with the base station after performing the random access procedure; and transmitting to the base station, on a beam, a scheduling request state indicating the selected second antenna sub-array.

24 Claims, 17 Drawing Sheets

(56) References Cited

U.S. PATENT DOCUMENTS

2016/0198474 A1* 7/2016 Raghavan ......... H04W 72/0466
 370/335
2019/0132880 A1* 5/2019 Byun ................... H04B 7/0408

* cited by examiner

TECHNIQUES FOR SELECTING AN ANTENNA SUB-ARRAY AT A USER EQUIPMENT

CROSS REFERENCES

The present Application for Patent claims priority to U.S. Provisional Patent Application No. 62/476,464 by Chendamarai Kannan et al., entitled "Techniques For Selecting an Antenna Sub-Array At A User Equipment," filed Mar. 24, 2017, assigned to the assignee hereof and incorporated by reference in its entirety.

BACKGROUND

Field of the Disclosure

The present disclosure, for example, relates to wireless communication systems, and more particularly to techniques for selecting an antenna sub-array at a user equipment (UE).

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of base stations, each simultaneously supporting communication for multiple communication devices, otherwise known as UEs. In a Long-Term Evolution (LTE) or LTE-Advanced (LTE-A) network, a set of one or more base stations may define an eNodeB (eNB). In a next generation, new radio (NR), millimeter wave (mmW), or 5G network, a base station may take the form of a smart radio head (or radio head (RH)) or access node controller (ANC), with a set of smart radio heads in communication with an ANC defining a gNodeB (gNB). A base station may communicate with a set of UEs on downlink channels (e.g., for transmissions from a base station to a UE) and uplink channels (e.g., for transmissions from a UE to a base station).

Wireless devices that operate in mmW frequency ranges, e.g., 28 GHz, 40 GHz, 60 GHz, etc. may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies.

SUMMARY

In some cases, a UE configured for mmW communication may include a plurality of antenna sub-arrays (e.g., a plurality of separate panels of antenna elements), with one of the antenna sub-arrays being connectable to a radio frequency (RF) chain of the UE at a time. When performing an initial acquisition procedure, the UE may connect a first of its antenna sub-arrays to an RF chain, measure at least one signal (e.g., signals on a plurality of directional beams) received from a base station, and determine whether the at least one signal measurement satisfies a threshold. If the UE successively connects each of its antenna sub-arrays to the RF chain and performs signal measurements for each antenna sub-array, the "acquisition time" for acquiring a network associated with the base station may be fairly long. On the other hand, if the UE only acquires measurements for a subset of its antenna sub-arrays, or stops acquiring measurements when it identifies a measurement satisfying a threshold, the UE may communicate with the base station using an antenna sub-array that is less than optimal. Techniques described in the present disclosure enable a UE to balance the tradeoff between shorter acquisition time and greater reliability by performing an initial acquisition procedure with a base station using each antenna sub-array of a first subset of antenna sub-arrays, selecting an antenna from the first subset for performing a random access procedure, and then selectively measuring at least one signal received from the base station for the purpose of determining whether a different antenna sub-array should be selected for communication with the base station.

In one example, a method for wireless communication at a UE having a plurality of antenna sub-arrays is described. The method may include performing an initial acquisition procedure with a base station using each antenna sub-array of a first subset of antenna sub-arrays; selecting an antenna sub-array from the first subset; and performing a random access procedure with the base station using the selected antenna sub-array. The first subset may include two or more antenna sub-arrays of the plurality of antenna sub-arrays.

In one example, an apparatus for wireless communication at a UE having a plurality of antenna sub-arrays is described. The apparatus may include a processor, memory in electronic communication with the processor, and instructions stored in the memory. The instructions may be executable by the processor to perform an initial acquisition procedure with a base station using each antenna sub-array of a first subset of antenna sub-arrays; to select an antenna sub-array from the first subset; and to perform a random access procedure with the base station using the selected antenna sub-array. The first subset may include two or more antenna sub-arrays of the plurality of antenna sub-arrays.

In one example, another apparatus for wireless communication at a UE having a plurality of antenna sub-arrays is described. The apparatus may include means for performing an initial acquisition procedure with a base station using each antenna sub-array of a first subset of antenna sub-arrays; means for selecting an antenna sub-array from the first subset; and means for performing a random access procedure with the base station using the selected antenna sub-array. The first subset may include two or more antenna sub-arrays of the plurality of antenna sub-arrays.

In one example, a non-transitory computer-readable medium storing computer-executable code for wireless communication at a UE having a plurality of antenna sub-arrays is described. The code may be executable by a processor to perform an initial acquisition procedure with a base station using each antenna sub-array of a first subset of antenna sub-arrays; to select an antenna sub-array from the first subset; and to perform a random access procedure with the base station using the selected antenna sub-array. The first subset may include two or more antenna sub-arrays of the plurality of antenna sub-arrays.

Some examples of the method, apparatus, and non-transitory computer-readable medium described above may further include processes, features, means, or instructions for transmitting, to the base station, an indication of a total number of antenna sub-arrays in the plurality of antenna sub-arrays. In some examples, the indication of the total number of antenna sub-arrays in the plurality of antenna sub-arrays may be transmitted to the base station during the performance of the random access procedure or after the performance of the random access procedure.

Some examples of the method, apparatus, and non-transitory computer-readable medium described above may further include processes, features, means, or instructions for transmitting, to the base station, a second indication of a number of antenna sub-arrays that the UE is capable of monitoring at a predefined time period.

Some examples of the method, apparatus, and non-transitory computer-readable medium described above may further include processes, features, means, or instructions for identifying the first subset based at least in part on: a number of radio frequency (RF) chains of the UE, a connectivity of the RF chains to the plurality of antenna sub-arrays, a power setting of the UE, a total number of antenna sub-arrays in the plurality of antenna sub-arrays, a preconfigured minimum number of antenna sub-arrays, or a combination thereof.

Some examples of the method, apparatus, and non-transitory computer-readable medium described above may further include processes, features, means, or instructions for receiving, from the base station, an indication of a time window for performing antenna sub-array selection refinement; and measuring at least one signal received from the base station during the time window. The at least one signal may be received from the base station using at least one antenna sub-array of a second subset of one or more antenna sub-arrays in the plurality of antenna sub-arrays. The second subset may be disjoint from the first subset.

Some examples of the method, apparatus, and non-transitory computer-readable medium described above may further include processes, features, means, or instructions for selecting a second antenna sub-array to use for communication with the base station. The second antenna sub-array may be selected from the second subset based at least in part on the measurement of the at least one signal. In some examples, the second antenna sub-array may be selected based at least in part on: a measurement of at least one signal received by the second antenna sub-array satisfying a first threshold, a measurement of at least one signal received by the antenna sub-array used to perform the random access procedure satisfying a second threshold, or a combination thereof. In some examples, at least one of the first threshold or the second threshold may be preconfigured at the UE, determined based at least in part on a parameter of the UE, received from the base station, or a combination thereof. In some examples, at least one of the first threshold or the second threshold may include an absolute threshold or a relative improvement threshold. In some examples, the time window may be associated with at least one of: no UE-specific traffic for the UE, no or reduced broadcast traffic for the UE, UE-specific measurement signals received from the base station, broadcast measurement signals received from the base station, or a combination thereof. In some examples, the indication of the time window may be received in radio resource control (RRC) signaling.

Some examples of the method, apparatus, and non-transitory computer-readable medium described above may further include processes, features, means, or instructions for selecting a second antenna sub-array in the plurality of antenna sub-arrays to use for communication with the base station after performing the random access procedure; and transmitting to the base station, on a beam, a scheduling request state indicating the selected second antenna sub-array.

Some examples of the method, apparatus, and non-transitory computer-readable medium described above may further include processes, features, means, or instructions for selecting a second antenna sub-array in the plurality of antenna sub-arrays to use for communication with the base station after performing the random access procedure; identifying an absence of a scheduling request resource assignment; and performing a second random access procedure with the base station using the selected second antenna sub-array, based at least in part on the identification of the absence of the scheduling request resource assignment.

Some examples of the method, apparatus, and non-transitory computer-readable medium described above may further include processes, features, means, or instructions for measuring at least one signal received by each antenna sub-array of the first subset of two or more antenna sub-arrays while performing the initial acquisition procedure with the base station; and selecting the antenna sub-array used to perform the random access procedure based at least in part on the signal measurements. In some examples, the signal measurements may include signal strength measurements, and the selected antenna sub-array may be associated with a strongest signal strength measurement of the signal strength measurements.

In one example, another method for wireless communication at a UE having a plurality of antenna sub-arrays is described. The method may include receiving from a base station, using a first antenna sub-array in the plurality of antenna sub-arrays, an indication of a time window for performing antenna sub-array selection refinement; measuring at least one signal received from the base station during the time window; and determining whether to select a second antenna sub-array to use for communication with the base station based at least in part on the measuring. The at least one signal may be received from the base station using at least one antenna sub-array in the plurality of antenna sub-arrays.

In one example, another apparatus for wireless communication at a UE having a plurality of antenna sub-arrays is described. The apparatus may include a processor, memory in electronic communication with the processor, and instructions stored in the memory. The instructions may be executable by the processor to receive from a base station, using a first antenna sub-array in the plurality of antenna sub-arrays, an indication of a time window for performing antenna sub-array selection refinement; to measure at least one signal received from the base station during the time window; and to determine whether to select a second antenna sub-array to use for communication with the base station based at least in part on the measuring. The at least one signal may be received from the base station using at least one antenna sub-array in the plurality of antenna sub-arrays.

In one example, another apparatus for wireless communication at a UE having a plurality of antenna sub-arrays is described. The apparatus may include means for receiving from a base station, using a first antenna sub-array in the plurality of antenna sub-arrays, an indication of a time window for performing antenna sub-array selection refinement; means for measuring at least one signal received from the base station during the time window; and means for determining whether to select a second antenna sub-array to use for communication with the base station based at least in part on the measuring. The at least one signal may be received from the base station using at least one antenna sub-array in the plurality of antenna sub-arrays.

In one example, another non-transitory computer-readable medium storing computer-executable code for wireless communication at a UE having a plurality of antenna sub-arrays is described. The code may be executable by a processor to receive from a base station, using a first antenna sub-array in the plurality of antenna sub-arrays, an indication of a time window for performing antenna sub-array selection refinement; to measure at least one signal received from the base station during the time window; and to determine whether to select a second antenna sub-array to use for communication with the base station based at least in part on the measuring. The at least one signal may be received from the base station using at least one antenna sub-array in the plurality of antenna sub-arrays.

Some examples of the method, apparatus, and non-transitory computer-readable medium described above may further include processes, features, means, or instructions for selecting the second antenna sub-array to use for communication with the base station.

In some examples of the method, apparatus, and non-transitory computer-readable medium described above, the indication of time window may be received before the UE performs an initial acquisition procedure with the base station using each antenna sub-array in the plurality of antenna sub-arrays.

In one example, another method for wireless communication at a UE having a plurality of antenna sub-arrays is described. The method may include performing a random access procedure with a base station using a first antenna sub-array in the plurality of antenna sub-arrays; selecting a second antenna sub-array in the plurality of antenna sub-arrays to use for communication with the base station after performing the random access procedure; and transmitting to the base station, on a beam, a scheduling request state indicating the selected second antenna sub-array.

In one example, another apparatus for wireless communication at a UE having a plurality of antenna sub-arrays is described. The apparatus may include a processor, memory in electronic communication with the processor, and instructions stored in the memory. The instructions may be executable by the processor to perform a random access procedure with a base station using a first antenna sub-array in the plurality of antenna sub-arrays; to select a second antenna sub-array in the plurality of antenna sub-arrays to use for communication with the base station after performing the random access procedure; and to transmit to the base station, on a beam, a scheduling request state indicating the selected second antenna sub-array.

In one example, another apparatus for wireless communication at a UE having a plurality of antenna sub-arrays is described. The apparatus may include means for performing a random access procedure with a base station using a first antenna sub-array in the plurality of antenna sub-arrays; means for selecting a second antenna sub-array in the plurality of antenna sub-arrays to use for communication with the base station after performing the random access procedure; and means for transmitting to the base station, on a beam, a scheduling request state indicating the selected second antenna sub-array.

In one example, another non-transitory computer-readable medium storing computer-executable code for wireless communication at a UE having a plurality of antenna sub-arrays is described. The code may be executable by a processor to perform a random access procedure with a base station using a first antenna sub-array in the plurality of antenna sub-arrays; to select a second antenna sub-array in the plurality of antenna sub-arrays to use for communication with the base station after performing the random access procedure; and to transmit to the base station, on a beam, a scheduling request state indicating the selected second antenna sub-array.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A wireless communication system (e.g., a mmW system) may utilize directional or beamformed transmissions (e.g., beams) for communication. For example, a base station may transmit signals on multiple beams associated with different directions. In some cases, the base station may engage in beam sweeping over a portion (or all) of the possible beams for transmitting messages or signals intended for UEs distributed throughout a coverage area of the base station. For example, a base station may transmit a discovery reference signal (DRS), synchronization channel, measurement reference signal (MRS), beam training sequence (BTS), or other signal on a plurality of beams. A UE that receives one of these signals may acquire a network associated with the base station. Techniques described in the present disclosure may be used to select an antenna sub-array at a UE for communicating with a base station.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Figure 1:
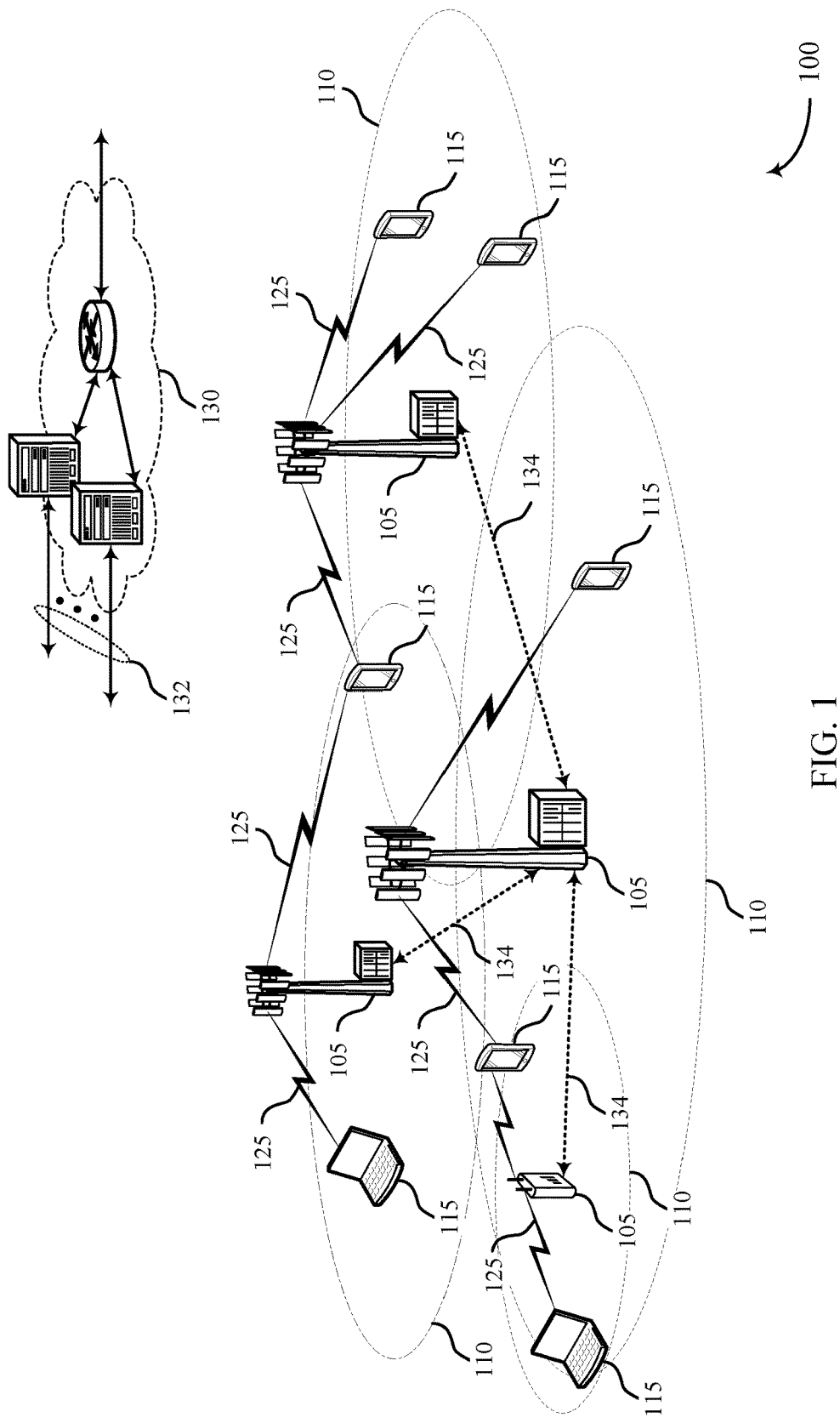
FIG. 1 shows an example of a wireless communication system, in accordance with various aspects of the present disclosure.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a Long Term Evolution (LTE), LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) or gNodeBs (gNBs).

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

At times, a UE 115 may perform an initial access (or initial acquisition) procedure with a base station 105. When performing the initial access procedure, the UE 115 may search for a DRS, synchronization channel, MRS, BTS, or other signal transmitted by the base station 105. The signal may include information usable by the UE 115 to synchronize the UE 115 with the base station 105, so that the UE 115 may communicate with the base station 105. After synchronizing with the base station 105, the UE 115 may initiate a random access procedure with the base station by transmitting a random access preamble to the base station.

Figure 2:
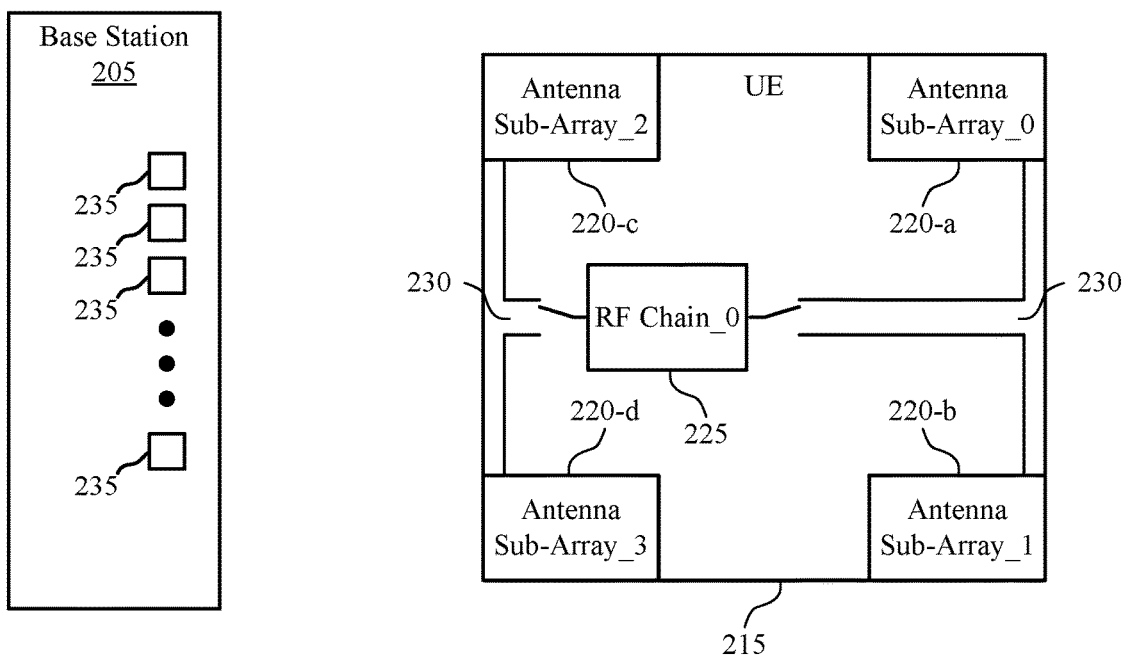
FIG. 2 shows an example of a wireless communication system, in accordance with various aspects of the present disclosure.

FIG. 2 shows an example of a wireless communication system 200, in accordance with various aspects of the present disclosure. The wireless communication system 200 may be an example of aspects of the wireless communication system 100, and may include a base station 205 and a UE 215. The base station 205 and UE 215 may be examples of aspects of the base stations and UEs described with reference to FIG. 1.

The UE 215 may include a plurality of antenna sub-arrays 220 (e.g., M antenna sub-arrays (M≥2), including a first antenna sub-array 220-a (Antenna Sub-Array_0), a second antenna sub-array 220-b (Antenna Sub-Array_1), a third antenna sub-array 220-c (Antenna Sub-Array_2), and a fourth antenna sub-array 220-d (Antenna Sub-Array_3)) and a number of RF chains 225 (e.g., N RF chains (N≤M), including a RF chain 225 (RF Chain_0)). In FIG. 2, M=4 and N=1.

In some implementations of the UE 215, the RF chain 225 may be connected to all of the antenna sub-arrays 220 at once, in a fully-connected mode. However, a fully-connected implementation can be more complex and/or more costly. In other implementations of the UE 215, the RF chain 225 may be connected to one antenna sub-array 220 of the UE 215 at a time, in a partitioned mode. A partitioned implementation can be less complex and/or less costly.

Antenna sub-array selection (e.g., selection of the antenna sub-array 220 coupled to the RF chain 225 (or in other cases, selection of the antenna sub-array coupled to each of a plurality of RF chains)) may be supported by the UE 215. Antenna sub-array selection may be achieved, at least in part, using antenna switching elements 230 (e.g., switches or multiplexers), which may be programmed to couple one or more antenna sub-arrays 220 to the RF chain 225. When an antenna sub-array 220 is coupled to the RF chain 225, the antenna sub-array 220 may be used to wirelessly communicate with another wireless device (e.g., the base station 205). In some examples, multiple antenna sub-arrays 220 may be coupled to the RF chain 225, or in the case of a UE having multiple RF chains (not shown), to the same or different RF chains of the UE. A UE that has multiple RF chains may include one or more transmit (Tx) RF chains, receive (Rx) RF chains, or Tx/Rx RF chains.

The base station 205 may also include a plurality of antenna sub-arrays 235. In some examples, the base station 205 and UE 215 may have different numbers of antenna sub-arrays. The antenna sub-arrays 235 of the base stations 205 may have different positions, orientations, or polarizations on the base station 205. The antenna sub-arrays 220 of the UE 215 may have different positions, orientations, or polarizations on the UE 215.

Under some conditions, one or more of the antenna sub-arrays 220 of the UE 215 may be blocked (e.g., the fourth antenna subarray 220-d may be blocked by a hand of a user of the UE 215) or one or more of the antenna sub-arrays 220 may be oriented in a suboptimal direction for transmitting/receiving signals (e.g., signals on beams) to/from the base station 205. The UE 215 may therefore perform an initial acquisition procedure with the base station 205 using each of one or more of the antenna sub-arrays 220, and may select one or more of the antenna sub-arrays 220 for communicating with the base station 205. In some examples, the UE 215 may receive at least one signal (e.g., a DRS, a synchronization channel, a MRS, a TS, or some other form of signal) from the base station 205, measure the at least one signal using one or more of the antenna sub-arrays 220, and select an antenna sub-array 220 for communicating with the base station 205 based at least in part on the measurements. In some examples, the signal measurements may include one or more of reference signal received power (RSRP) measurements, received signal strength indication (RSSI) measurements, reference signal received quality (RSRQ) measurements, etc.

In some cases, the UE 215 may successively connects each of the antenna sub-arrays 220 to the RF chain 225 and perform measurements on signals received from the base station 205 for each antenna sub-array 220. In these cases, the acquisition time for the UE 215 may be nT, where n is the number of antenna sub-arrays 220, and T is the average time to acquire the network using one of the antenna sub-arrays 220. If the UE only acquires measurements for a subset of the antenna sub-arrays 220, or stops acquiring measurements when it identifies a measurement satisfying a threshold, the UE 215 may communicate with the base station 205 using an antenna sub-array 220 that is less than optimal.

Techniques described in the present disclosure enable a UE, such as the UE 215, to balance the tradeoff between shorter acquisition time and greater reliability by performing an initial acquisition procedure with a base station using each antenna sub-array of a first subset of antenna sub-arrays, selecting an antenna from the first subset for performing a random access procedure, and then selectively measuring at least one signal received from the base station for the purpose of determining whether a different antenna sub-array should be selected for communication with the base station.

Figure 3:
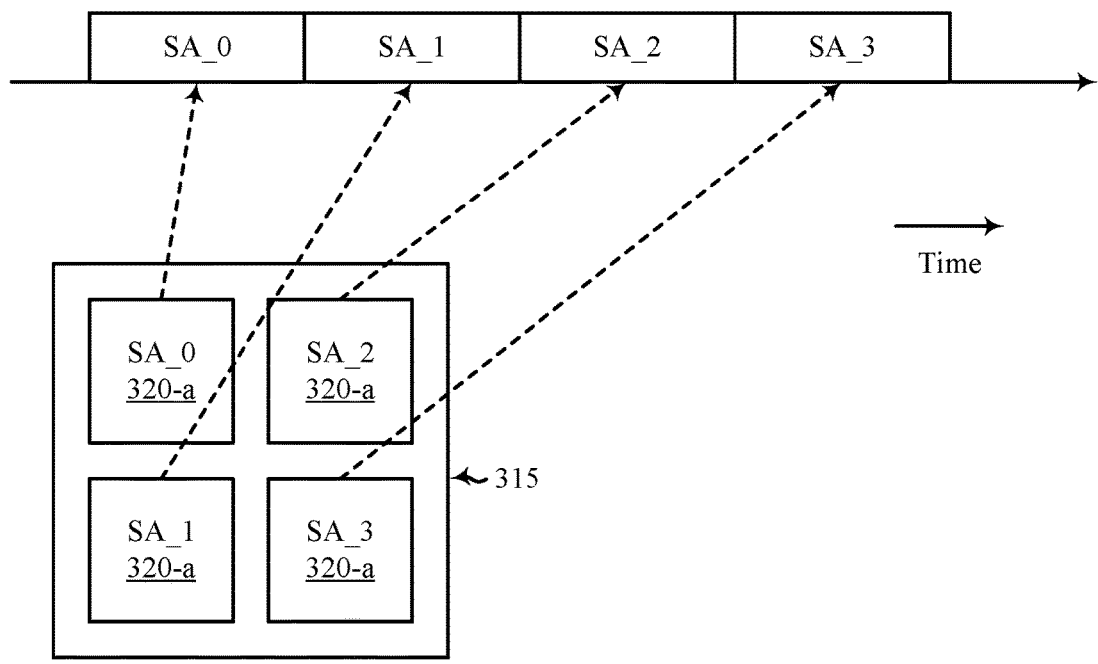
FIG. 3 shows an initial acquisition timeline for a UE having a plurality of antenna sub-arrays 320, in accordance with various aspects of the present disclosure.

FIG. 3 shows an initial acquisition timeline 300 for a UE 315 having a plurality of antenna sub-arrays 320, in accordance with various aspects of the present disclosure. The UE 315 may be an example of aspects of one or more of the UEs described with reference to FIG. 1 or 2.

The antenna sub-arrays 320 may include a first antenna sub-array 320-a (SA_0), a second antenna sub-array 320-b (SA_1), a third antenna sub-array 320-c (SA_2), and a fourth antenna sub-array 320-d (SA_3). By way of example, the UE 315 may sequentially connect each of the antenna sub-arrays 320 to an RF chain of the UE 315, and may perform an initial acquisition procedure with a base station using each of the antenna sub-arrays 320. Also by way of example, the UE 315 may sequentially connect each of the antenna sub-arrays 320 to the RF chain in the order of: first antenna sub-array 320-a, second antenna sub-array 320-b, third antenna sub-array 320-c, and fourth antenna sub-array 320-d. Assuming that signal measurements associated with the second antenna sub-array 320-b, the third antenna sub-array 320-c, and the fourth antenna sub-array 320-d each satisfy a threshold that indicates these antenna sub-arrays are "good enough" to use when communicating with the base station, and assuming that the signal measurements associated with the fourth antenna sub-array 320-d are the "best," the UE 315 may select the fourth antenna sub-array 320-d to communicate with the base station, and may perform a random access procedure with the base station using the fourth antenna sub-array 320-d. However, if the average acquisition time for each antenna sub-array 320 is T, the acquisition time for the UE 315 to acquire the network via the base station is 4T.

Figure 4:
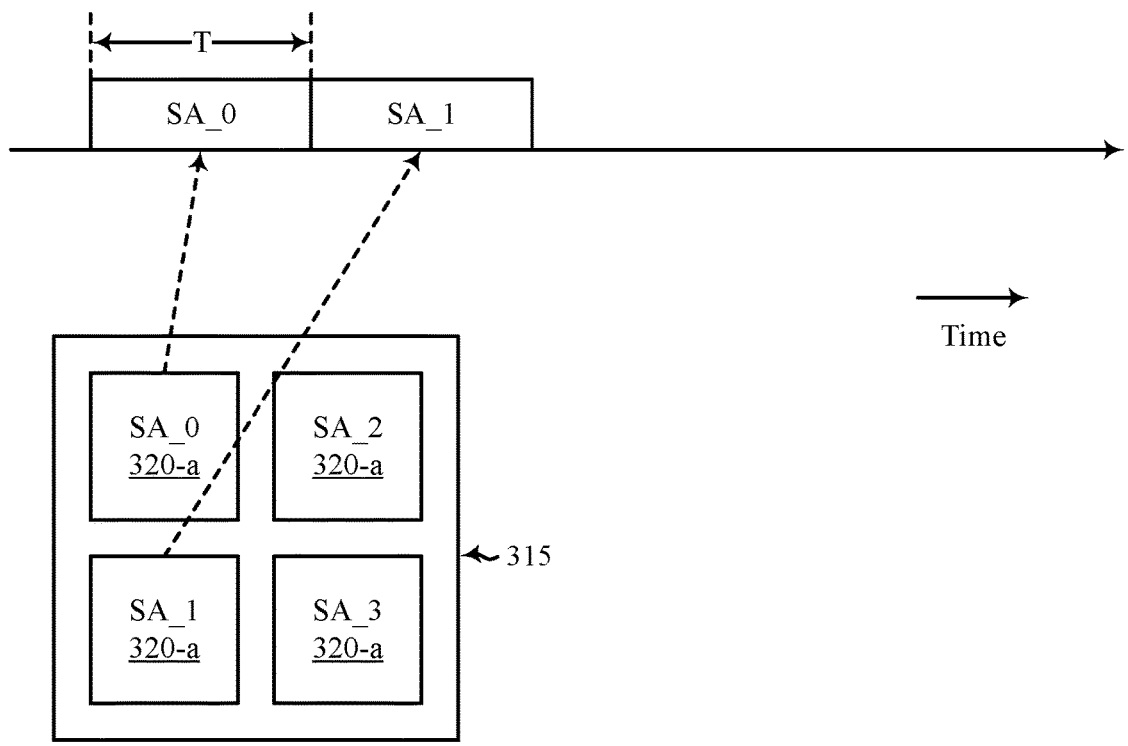
FIG. 4 shows an alternative initial acquisition timeline for the UE, in accordance with various aspects of the present disclosure.

FIG. 4 shows an alternative initial acquisition timeline 400 for the UE 315, in accordance with various aspects of the present disclosure. In the alternative initial acquisition timeline 400, the UE 315 may perform the initial acquisition procedure with the base station using the first antenna sub-array 320-a and the second antenna sub-array 320-b, determine that signal measurements associated with the second antenna sub-array 320-b satisfy a threshold and are "good enough" to use when communicating with the base station, the UE 315, perform a random access procedure with the base station using the second antenna sub-array 320-b, and refrain from acquiring signal measurements for the third antenna sub-array 320-c and the fourth antenna sub-array 320-d. Thus, the alternative initial acquisition timeline 400 therefore reduces the acquisition time for the UE 315 to acquire the network from 4T to 2T. However, the alternative initial acquisition timeline 400 results in the UE 315 communicating with the base station 305 using a less than optimal antenna sub-array 320.

Figure 5:
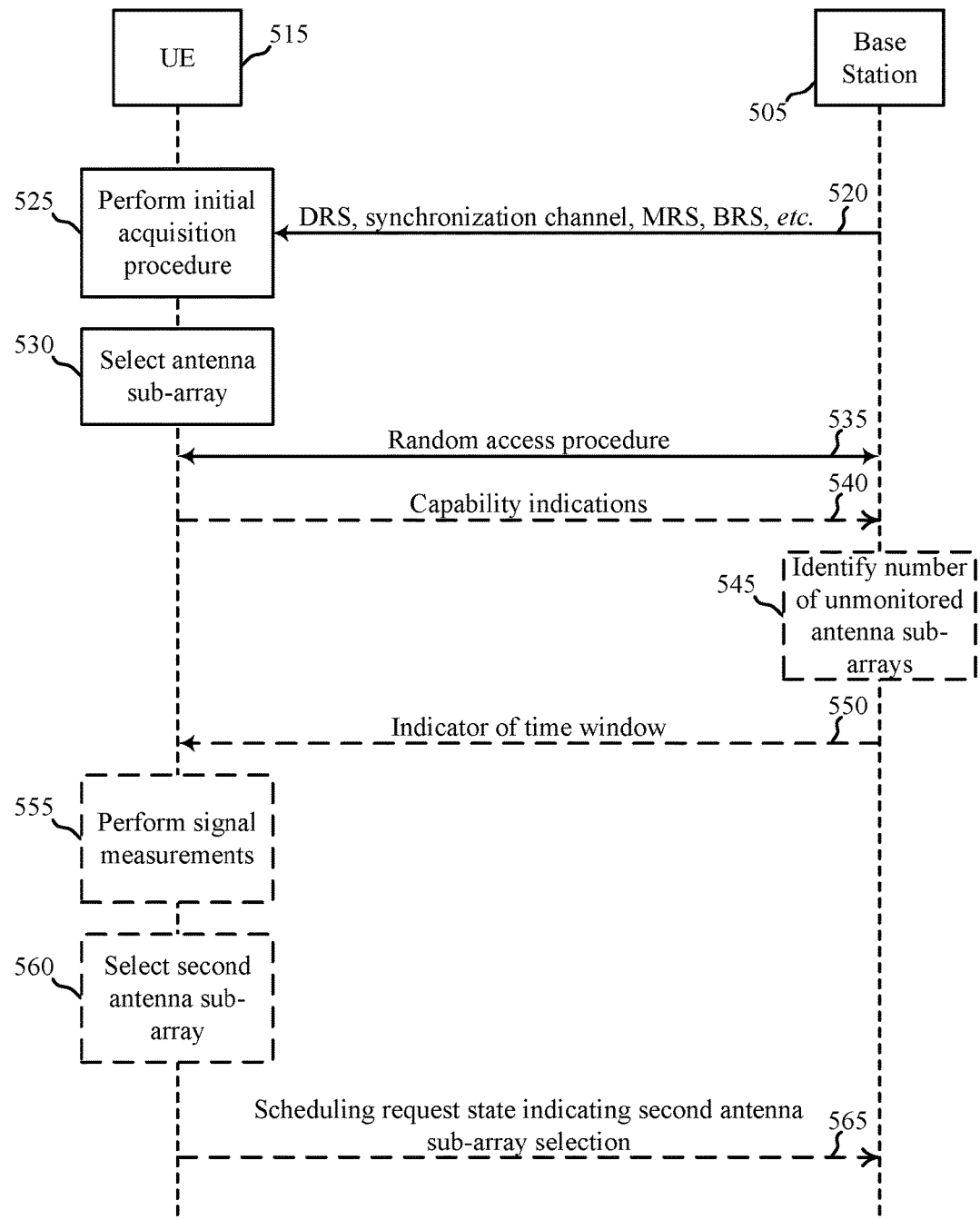
FIG. 5 shows an example message flow between a base station and a UE, in accordance with various aspects of the present disclosure.

FIG. 5 shows an example message flow 500 between a base station 505 and a UE 515, in accordance with various aspects of the present disclosure. The base station 505 and UE 515 may be examples of aspects of the base stations described with reference to FIGS. 1 and 2, and the UEs described with reference to FIGS. 1-4.

At 520, the base station 505 may transmit at least one signal, such as a DRS, synchronization channel, MRS, or BTS. At 525, the UE 515 may perform an initial acquisition procedure with the base station 505. The initial acquisition procedure may be performed using each antenna sub-array of a first subset of antenna sub-arrays of the UE 515. The first subset of antenna sub-arrays may include two or more antenna sub-arrays of a plurality of antenna sub-arrays of the UE 515. In some examples, the UE 515 may identify the first subset based at least in part on a number of RF chains of the UE 515, a connectivity of the RF chains to the plurality of antenna sub-arrays (as described with reference to FIG. 2), a power setting of the UE 515, a total number of antenna sub-arrays in the plurality of antenna sub-arrays, a preconfigured minimum number of antenna sub-arrays (e.g., K1 antenna sub-arrays), or a combination thereof. In some examples, the preconfigured minimum number of antenna sub-arrays may be specified in a standard. The preconfigured minimum number of antenna sub-arrays may be a single fixed number of antenna sub-arrays, or a number based on other parameters, such as the number of antenna sub-arrays (N) and/or RF chains of the UE 515.

At 530, the UE 515 may select an antenna sub-array from the first subset of two or more antenna sub-arrays. In some examples, the UE 515 may measure at least one signal received by each antenna sub-array of the first subset of two or more antenna sub-arrays, while performing the initial acquisition procedure with the base station, and select the antenna sub-array used to perform the random access procedure based at least in part on the signal measurements. In some examples, the signal measurements may include signal strength measurements, and the selected antenna sub-array may be associated with a strongest signal strength measurement of the signal strength measurements.

At 535, the UE 515 may perform a random access procedure with the base station using the selected antenna sub-array.

At 540, during or after the performance of the random access procedure, the UE 515 may transmit, to the base station 505, an indication of a total number (N) of antenna sub-arrays in the plurality of antenna sub-arrays of the UE 515. The UE 515 may also or alternatively transmit, to the base station 505, a second indication of a number of antenna sub-arrays (K2) that the UE 515 is capable of monitoring at a predefined time period. In some examples, the indications transmitted at 540 may be transmitted as part of a set of capabilities of the UE 515.

At 545, the base station 505 may use the preconfigured minimum number of antenna sub-arrays (K1) and/or the indicated capabilities of the UE 515 (e.g., N and/or K2) to determine how many antenna sub-arrays the UE 515 may not have monitored when performing the initial acquisition procedure at 525. For example, the base station 505 may compute N-K1 or N-K2. In some examples, the base station 505 may use the determination of how many antenna sub-arrays may not have been monitored by the UE 515 to identify resources that the UE 515 may use to monitor additional antenna sub-arrays of the UE 515, so that the UE 515 may determine whether a different antenna sub-array of the UE 515 may be more optimal for communicating with the base station 505.

At 550, the base station 550 may indicate, to the UE 515, a time window for performing antenna sub-array selection refinement (e.g., for determining whether a different antenna sub-array of the UE 515, or a different beam, may be more optimal for communicating with the base station 505). In some examples, the time window may be associated with at least one of no UE-specific traffic for the UE (e.g., no physical downlink shared channel (PDSCH) traffic for the UE and no physical downlink control channel (PDDCH)

traffic with paging for the UE); no or reduced broadcast traffic for the UE; UE-specific measurement signals (e.g., a MRS or BRS) received from the base station; broadcast measurement signals (e.g., a DRS) received from the base station; or a combination thereof. In some examples, the indication of the time window may be received in radio resource control (RRC) signaling (e.g., the RRC signaling may indicate information such as a periodicity and offset of a periodic time window usable by the UE 515). At 555, the UE 515 may use the time window indicated by the base station 505, at least in part, to perform measurements on the signals received from the base station 505 using antenna sub-arrays that were not previously monitored at 525 (i.e., antenna sub-arrays in a second subset of one or more antenna sub-arrays, in which the second is disjoint from the first subset).

At 560, after performing antenna sub-array selection refinement at 555, the UE 515 may select a second antenna sub-array to use for communication with the base station 505. In some examples, the second antenna sub-array may be selected from a second subset of antenna sub-arrays, based at least in part on a measurement of at least one signal received from the base station during the time window at 555. In some examples, the second antenna sub-array may be selected based at least in part on a measurement of at least one signal received by the second antenna sub-array satisfying a first threshold, or a measurement of at least one signal received by the antenna sub-array used to perform the random access procedure satisfying a second threshold, or a combination thereof. In some examples, at least one of the first threshold or the second threshold may be preconfigured at the UE 515, determined based at least in part on a parameter of the UE 515, received from the base station 505, or a combination thereof. In some examples, at least one of the first threshold or the second threshold may include an absolute threshold or a relative improvement threshold. In some examples, the UE 515 may select the second antenna sub-array based at least in part on 1) a strength of at least one signal received by the second antenna sub-array exceeding the first threshold, and 2) a strength of at least one signal received by the antenna sub-array selected at 530 falling below the second threshold.

In some cases, the UE 515 may perform a random access procedure during initial access of a network via a base station, after transmitting a scheduling request, during a RRC connection re-establishment procedure, or during a handover. A timing advance may be required in a RRC connected state. In a NR mmW system, a UE may also perform an initial random access procedure (i.e., a random access channel (RACH) procedure) at multiple locations corresponding to multiple base station/UE beam combinations. At 565, and in some examples, the UE 515 may transmit to the base station, on a beam, a scheduling request state (e.g., a multiple bit indication) indicating the selected second antenna sub-array (e.g., a switch to the second antenna sub-array at the UE 515). When the second antenna sub-array is selected before a scheduling request resource assignment is received by the UE 515, and in some cases when the second antenna sub-array is selected before the indication of the time window is received at 550, the UE 515 may perform a second random access procedure with the base station 505 using the selected second antenna sub-array (e.g., on different RACH resources associated with a different antenna sub-array selection).

Figure 6:
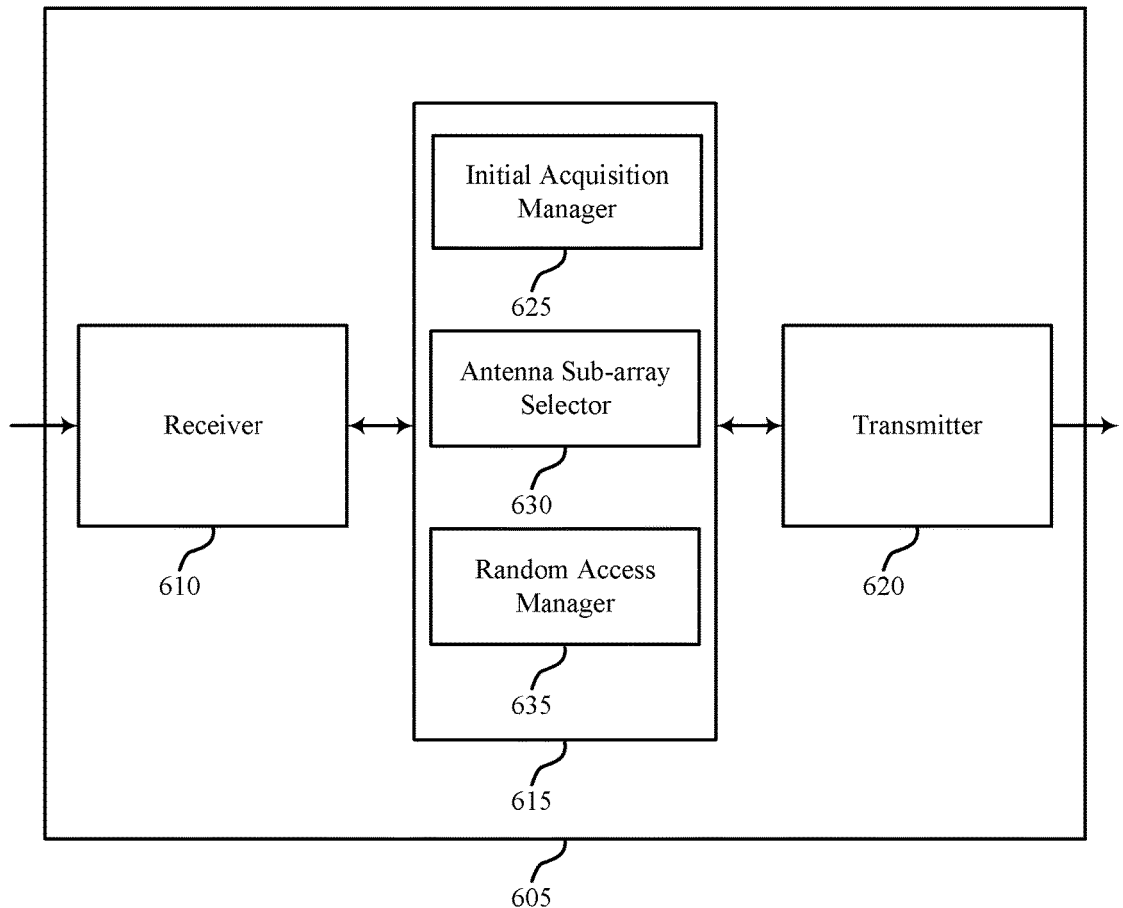
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of a UE described with reference to FIGS. 1-5. The apparatus 605 may include a receiver 610, a wireless communication manager 615, and a transmitter 620. The apparatus 605 may also include a processor. Each of these components may be in communication with one another (e.g., via one or more buses).

The receiver 610 may receive data or control signals or information (i.e., transmissions), some or all of which may be associated with various information channels (e.g., data channels, control channels, etc.). Received signals or information, or measurements performed thereon, may be passed to other components of the apparatus 605. The receiver 610 may include one or more RF chains that are associated with a plurality of antenna sub-arrays in a fixed or switched manner.

The transmitter 620 may transmit data or control signals or information (i.e., transmissions) generated by other components of the apparatus 605, some or all of which may be associated with various information channels (e.g., data channels, control channels, etc.). In some examples, the transmitter 620 may be collocated with the receiver 610 in a transceiver. For example, the transmitter 620 and receiver 610 may be an example of aspects of the transceiver(s) 1030 described with reference to FIG. 10. The transmitter 620 may include one or more RF chains that associated with a plurality of antenna sub-arrays in a fixed or switched manner. The RF chains and antenna sub-arrays associated with the transmitter 620 may include some or all of the same antenna sub-arrays associated with the receiver 610, or different antenna sub-arrays.

The wireless communication manager 615 and/or at least some of its various sub-components may be implemented in hardware, software executed by a processor, firmware, or any combination thereof. If implemented in software executed by a processor, the functions of the wireless communication manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The wireless communication manager 615 and/or at least some of its various sub-components may be physically located at various positions, including being distributed such that portions of functions are implemented at different physical locations by one or more physical devices. In some examples, the wireless communication manager 615 and/or at least some of its various sub-components may be a separate and distinct component in accordance with various aspects of the present disclosure. In other examples, the wireless communication manager 615 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The wireless communication manager 615 may include an initial acquisition manager 625, an antenna sub-array selector 630, and a random access manager 635.

The initial acquisition manager 625 may be used to perform an initial acquisition procedure with a base station using each antenna sub-array of a first subset of two or more antenna sub-arrays, as described for example with reference to FIG. 4 or 5. The first subset may include two or more antenna sub-arrays of the plurality of antenna sub-arrays.

The antenna sub-array selector 630 may be used to select an antenna sub-array from the first subset of two or more antenna sub-arrays, as described for example with reference to FIG. 4 or 5.

The random access manager 635 may be used to perform a random access procedure with the base station using the selected antenna sub-array, as described for example with reference to FIG. 4 or 5.

Figure 7:
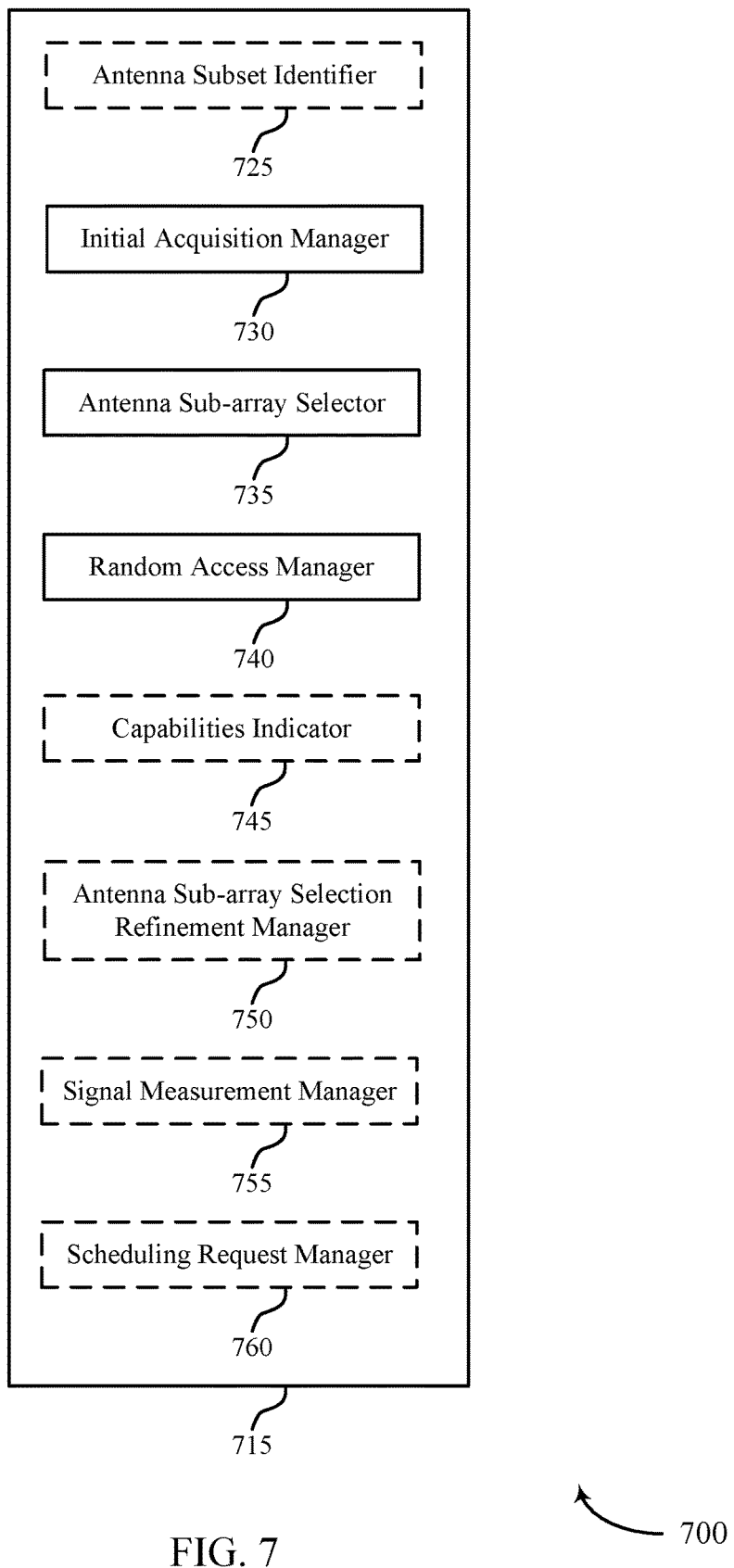
FIG. 7 shows a block diagram of a wireless communication manager, in accordance with various aspects of the present disclosure.

FIG. 7 shows a block diagram 700 of a wireless communication manager 715, in accordance with various aspects of the present disclosure. The wireless communication manager 715 may be an example of aspects of the wireless communication manager described with reference to FIG. 6. The wireless communication manager 715 may include an optional antenna subset identifier 725, an initial acquisition manager 730, an antenna sub-array selector 735, a random access manager 740, an optional capabilities indicator 745, an optional antenna sub-array selection refinement manager 750, an optional signal measurement manager 755, and/or an optional scheduling request manager 760. Each of these components may communicate, directly or indirectly, with one another (e.g., via one or more buses). The initial acquisition manager 730, antenna sub-array selector 735, and random access manager 740 may be examples of the initial acquisition manager 625, antenna sub-array selector 630, and random access manager 635 described with reference to FIG. 6.

In some examples, the antenna subset identifier 725 may be used to identify a first subset of two or more antenna sub-array of the plurality of antenna sub-arrays, as described for example with reference to FIG. 4 or 5. In some examples, the first subset may be identified based at least in part on a number of RF chains of the UE, a connectivity of the RF chains to the plurality of antenna sub-arrays, a power setting of the UE, a total number of antenna sub-arrays in the plurality of antenna sub-arrays, a preconfigured minimum number of antenna sub-arrays, or a combination thereof.

The initial acquisition manager 730 may be used to perform an initial acquisition procedure with a base station using each antenna sub-array of a first subset of two or more antenna sub-arrays, as described for example with reference to FIG. 4 or 5. The first subset may include two or more antenna sub-arrays of the plurality of antenna sub-arrays.

The antenna sub-array selector 735 may be used to select an antenna sub-array from the first subset of two or more antenna sub-arrays, as described for example with reference to FIG. 4 or 5. In some examples, the signal measurement manager 755 may be used to measure at least one signal received by each antenna sub-array of the first subset of two or more antenna sub-arrays while performing the initial acquisition procedure with the base station, and the antenna sub-array selector 735 may select the antenna sub-array used to perform the random access procedure based at least in part on the signal measurements. In some examples, the signal measurements may include signal strength measurements, and the selected antenna sub-array may be associated with a strongest signal strength measurement of the signal strength measurements.

The random access manager 740 may be used to perform a random access procedure with the base station using the selected antenna sub-array, as described for example with reference to FIG. 4 or 5.

In some examples, the capabilities indicator 745 may be used to transmit, to the base station, an indication of a total number of antenna sub-arrays in the plurality of antenna sub-arrays, as described for example with reference to FIG. 4 or 5. In some examples, the indication of the total number of antenna sub-arrays in the plurality of antenna sub-arrays may be transmitted to the base station during the performance of the random access procedure or after the performance of the random access procedure. The capabilities indicator 745 may also or alternatively be used to transmit, to the base station, a second indication of a number of antenna sub-arrays that the UE is capable of monitoring at a predefined time period, as described for example with reference to FIG. 4 or 5.

In some examples, the antenna sub-array selection refinement manager 750 may be used to receive, from the base station, an indication of a time window for performing antenna sub-array selection refinement, as described for example with reference to FIG. 4 or 5. In some examples, the time window may be associated with at least one of no UE-specific traffic for the UE, no or reduced broadcast traffic for the UE, UE-specific measurement signals received from the base station, broadcast measurement signals received from the base station, or a combination thereof. In some examples, the indication of the time window may be received in RRC signaling.

In some examples, the signal measurement manager 755 may be used to measure at least one signal received from the base station during the time window, as described for example with reference to FIG. 4 or 5. In some examples, the at least one signal may be received from the base station using at least one antenna sub-array of a second subset of one or more antenna sub-arrays in the plurality of antenna sub-arrays, with the second subset being disjoint from the first subset.

In some examples, the antenna sub-array selector 735 may further be used to select a second antenna sub-array to use for communication with the base station, as described for example with reference to FIG. 4 or 5. In some examples, the second antenna sub-array may be selected from the second subset based at least in part on the measurement of the at least one signal received from the base station during the time window. In some examples, the second antenna sub-array may be selected based at least in part on a measurement of at least one signal received by the second antenna sub-array satisfying a first threshold, a measurement of at least one signal received by the antenna sub-array used to perform the random access procedure satisfying a second threshold, or a combination thereof. In some examples, at least one of the first threshold or the second threshold may be preconfigured at the UE, determined based at least in part on a parameter of the UE, received from the base station, or a combination thereof. In some examples, at least one of the first threshold or the second threshold may include an absolute threshold or a relative improvement threshold.

In some examples, the antenna sub-array selector 735 may further be used to select a second antenna sub-array in the plurality of antenna sub-arrays to use for communication with the base station after performing the random access procedure, as described for example with reference to FIG. 4 or 5. In these examples, the scheduling request manager 760 may be used to transmit to the base station, on a beam, a scheduling request state indicating the selected second antenna sub-array, as described for example with reference to FIG. 4 or 5. In some examples, the at least one signal may be received from the base station using at least one antenna sub-array of a second subset of one or more antenna sub-arrays in the plurality of antenna sub-arrays, with the second subset being disjoint from the first subset.

In some examples, the antenna sub-array selector 735 may further be used to select a second antenna sub-array in the plurality of antenna sub-arrays to use for communication with the base station after performing the random access procedure, as described for example with reference to FIG. 4 or 5. In these examples, the scheduling request manager 760 may be used to identifying an absence of a scheduling request resource assignment, and the random access manager 740 may be used to perform a second random access procedure with the base station using the selected second antenna sub-array, based at least in part on the identification of the absence of the scheduling request resource assignment.

Figure 8:
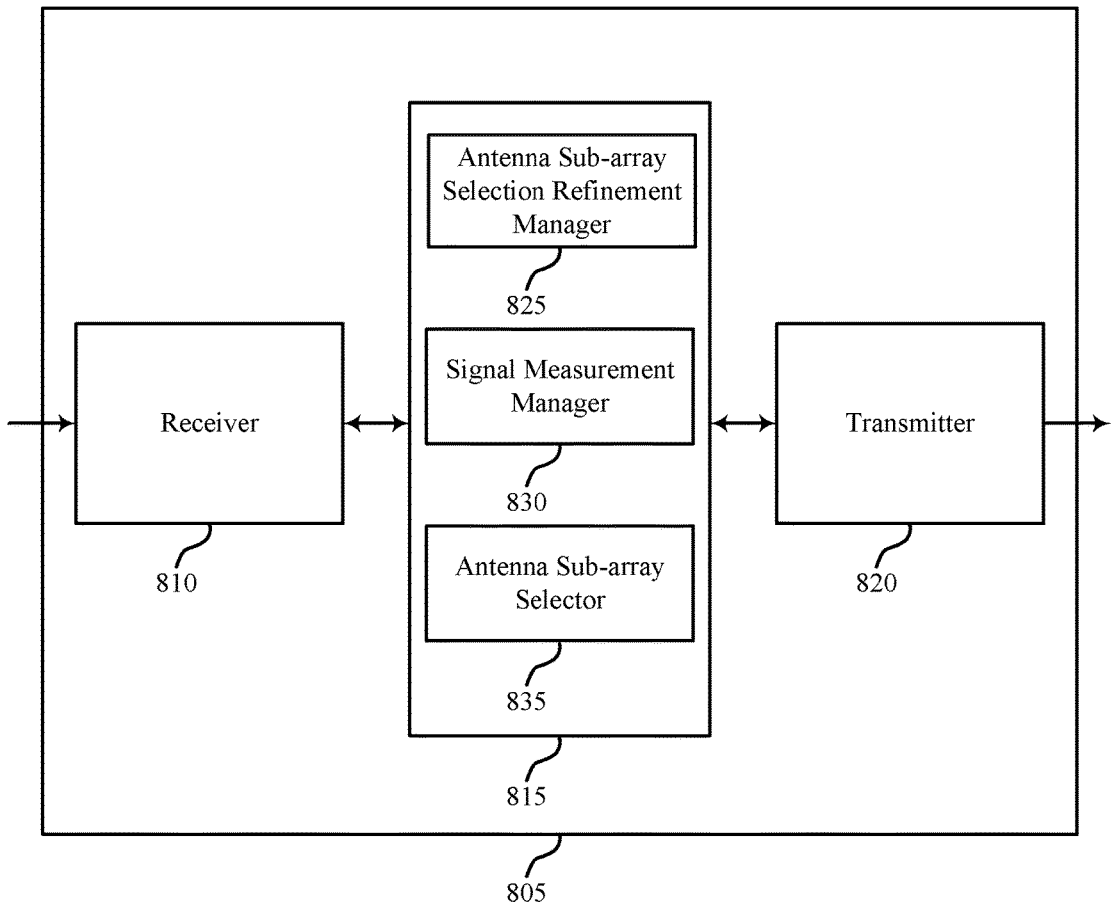
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. The apparatus 805 may be an example of aspects of a UE described with reference to FIGS. 1-5. The apparatus 805 may include a receiver 810, a wireless communication manager 815, and a transmitter 820. The apparatus 805 may also include a processor. Each of these components may be in communication with one another (e.g., via one or more buses).

The receiver 810 may receive data or control signals or information (i.e., transmissions), some or all of which may be associated with various information channels (e.g., data channels, control channels, etc.). Received signals or information, or measurements performed thereon, may be passed to other components of the apparatus 805. The receiver 810 may include one or more RF chains that are associated with a plurality of antenna sub-arrays in a fixed or switched manner.

The transmitter 820 may transmit data or control signals or information (i.e., transmissions) generated by other components of the apparatus 805, some or all of which may be associated with various information channels (e.g., data channels, control channels, etc.). In some examples, the transmitter 820 may be collocated with the receiver 810 in a transceiver. For example, the transmitter 820 and receiver 810 may be an example of aspects of the transceiver(s) 1030 described with reference to FIG. 10. The transmitter 820 may include one or more RF chains that associated with a plurality of antenna sub-arrays in a fixed or switched manner. The RF chains and antenna sub-arrays associated with the transmitter 820 may include some or all of the same antenna sub-arrays associated with the receiver 810, or different antenna sub-arrays.

The wireless communication manager 815 and/or at least some of its various sub-components may be implemented in hardware, software executed by a processor, firmware, or any combination thereof. If implemented in software executed by a processor, the functions of the wireless communication manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The wireless communication manager 815 and/or at least some of its various sub-components may be physically located at various positions, including being distributed such that portions of functions are implemented at different physical locations by one or more physical devices. In some examples, the wireless communication manager 815 and/or at least some of its various sub-components may be a separate and distinct component in accordance with various aspects of the present disclosure. In other examples, the wireless communication manager 815 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The wireless communication manager 815 may include an antenna sub-array selection refinement manager 825, a signal measurement manager 830, and an antenna sub-array selector 835.

The antenna sub-array selection refinement manager 825 may be used to receive from a base station, using a first antenna sub-array in the plurality of antenna sub-arrays, an indication of a time window for performing antenna sub-array selection refinement, as described for example with reference to FIG. 4 or 5. In some examples, the indication of the time window may be received before the UE performs an initial acquisition procedure with the base station using each antenna sub-array in the plurality of antenna sub-arrays.

The signal measurement manager 830 may be used to measure at least one signal received from the base station during the time window, as described for example with reference to FIG. 4 or 5. The at least one signal may be received from the base station using at least one antenna sub-array in the plurality of antenna sub-arrays.

The antenna sub-array selector 835 may be used to determine whether to select a second antenna sub-array to use for communication with the base station based at least in part on the measuring, as described for example with reference to FIG. 4 or 5. The antenna sub-array selector 835 may also be used to selecting the second antenna sub-array to use for communication with the base station.

Figure 9:
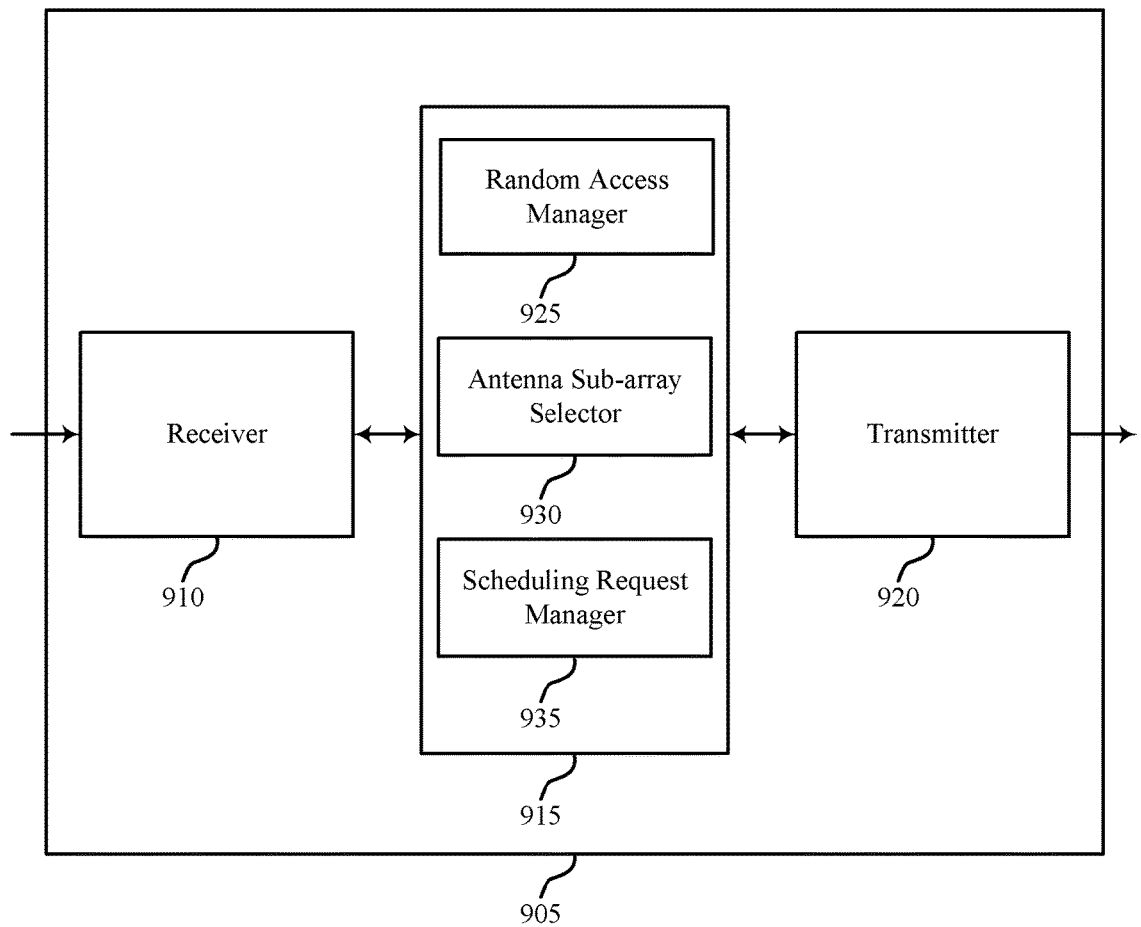
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. The apparatus 905 may be an example of aspects of a UE described with reference to FIGS. 1-5. The apparatus 905 may include a receiver 910, a wireless communication manager 915, and a transmitter 920. The apparatus 905 may also include a processor. Each of these components may be in communication with one another (e.g., via one or more buses).

The receiver 910 may receive data or control signals or information (i.e., transmissions), some or all of which may be associated with various information channels (e.g., data channels, control channels, etc.). Received signals or information, or measurements performed thereon, may be passed to other components of the apparatus 905. The receiver 910 may include one or more RF chains that are associated with a plurality of antenna sub-arrays in a fixed or switched manner.

The transmitter 920 may transmit data or control signals or information (i.e., transmissions) generated by other components of the apparatus 905, some or all of which may be associated with various information channels (e.g., data channels, control channels, etc.). In some examples, the transmitter 920 may be collocated with the receiver 910 in a transceiver. For example, the transmitter 920 and receiver 910 may be an example of aspects of the transceiver(s) 1030 described with reference to FIG. 10. The transmitter 920 may include one or more RF chains that associated with a plurality of antenna sub-arrays in a fixed or switched manner. The RF chains and antenna sub-arrays associated with the transmitter 920 may include some or all of the same antenna sub-arrays associated with the receiver 910, or different antenna sub-arrays.

The wireless communication manager 915 and/or at least some of its various sub-components may be implemented in hardware, software executed by a processor, firmware, or any combination thereof. If implemented in software executed by a processor, the functions of the wireless communication manager 915 and/or at least some of its various sub-components may be executed by a general-purpose processor, a DSP, an ASIC, an FPGA, or another programmable logic device, discrete gate or transistor logic, discrete hardware components, or any combination thereof designed to perform the functions described in the present disclosure.

The wireless communication manager 915 and/or at least some of its various sub-components may be physically located at various positions, including being distributed such that portions of functions are implemented at different physical locations by one or more physical devices. In some examples, the wireless communication manager 915 and/or at least some of its various sub-components may be a separate and distinct component in accordance with various aspects of the present disclosure. In other examples, the wireless communication manager 915 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The wireless communication manager 915 may include a random access manager 925, an antenna sub-array selector 930, and a scheduling request manager 935.

The random access manager 925 may be used to perform a random access procedure with a base station using a first antenna sub-array in the plurality of antenna sub-arrays, as described for example with reference to FIG. 4 or 5.

The antenna sub-array selector 930 may be used to select a second antenna sub-array in the plurality of antenna sub-arrays to use for communication with the base station after performing the random access procedure, as described for example with reference to FIG. 4 or 5. The at least one signal may be received from the base station using at least one antenna sub-array in the plurality of antenna sub-arrays.

The scheduling request manager 935 may be used to transmit to the base station, on a beam, a scheduling request state indicating the selected second antenna sub-array, as described for example with reference to FIG. 4 or 5.

Figure 10:
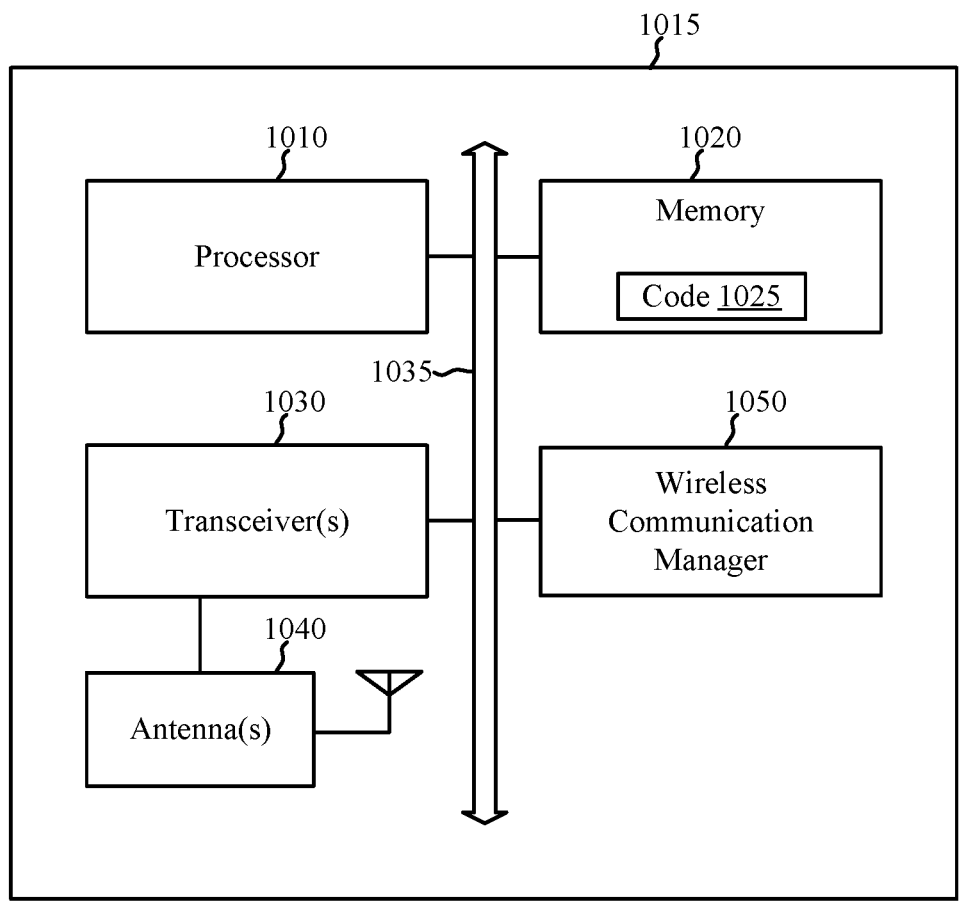
FIG. 10 shows a block diagram of a UE for use in wireless communication, in accordance with various aspects of the present disclosure.

FIG. 10 shows a block diagram 1000 of a UE 1015 for use in wireless communication, in accordance with various aspects of the present disclosure. The UE 1015 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 1015 may, in some examples, have an internal power supply (not shown), such as a small battery, to facilitate mobile operation. In some examples, the UE 1015 may be an example of aspects of one or more of the UEs described with reference to FIGS. 1-5, or aspects of the apparatus described with reference to FIG. 6, 8, or 9. The UE 1015 may be configured to implement at least some of the UE or apparatus techniques or functions described with reference to FIGS. 1-9.

The UE 1015 may include a processor 1010, a memory 1020, at least one transceiver (represented by transceiver(s) 1030), antennas 1040 (e.g., an antenna array), or a wireless communication manager 1050. Each of these components may be in communication with each other, directly or indirectly, over one or more buses 1035.

The memory 1020 may include random access memory (RAM) or read-only memory (ROM). The memory 1020 may store computer-readable, computer-executable code 1025 containing instructions that are configured to, when executed, cause the processor 1010 to perform various functions described herein related to wireless communication, including, for example, selecting an antenna sub-array. Alternatively, the computer-executable code 1025 may not be directly executable by the processor 1010 but be configured to cause the UE 1015 (e.g., when compiled and executed) to perform various of the functions described herein.

The processor 1010 may include an intelligent hardware device, e.g., a central processing unit (CPU), a microcontroller, an ASIC, etc. The processor 1010 may process information received through the transceiver(s) 1030 or information to be sent to the transceiver(s) 1030 for transmission through the antennas 1040. The processor 1010 may handle, alone or in connection with the wireless communication manager 1050, one or more aspects of communicating over (or managing communications over) one or more radio frequency spectrum bands.

The transceiver(s) 1030 may include a modem configured to modulate packets and provide the modulated packets to the antennas 1040 for transmission, and to demodulate packets received from the antennas 1040. The transceiver(s) 1030 may, in some examples, be implemented as one or more transmitters and one or more separate receivers. The transceiver(s) 1030 may support communications in one or more radio frequency spectrum bands. The transceiver(s) 1030 may be configured to communicate bi-directionally, via the antennas 1040, with one or more base stations or apparatuses, such as one or more of the base stations described with reference to FIGS. 1, 2, and 5.

The wireless communication manager 1050 may be configured to perform or control some or all of the UE or apparatus techniques or functions described with reference to FIGS. 1-9. The wireless communication manager 1050, or portions of it, may include a processor, or some or all of the functions of the wireless communication manager 1050 may be performed by the processor 1010 or in connection with the processor 1010. In some examples, the wireless communication manager 1050 may be an example of the wireless communication manager described with reference to FIG. 6, 7, 8, or 9.

Figure 11:
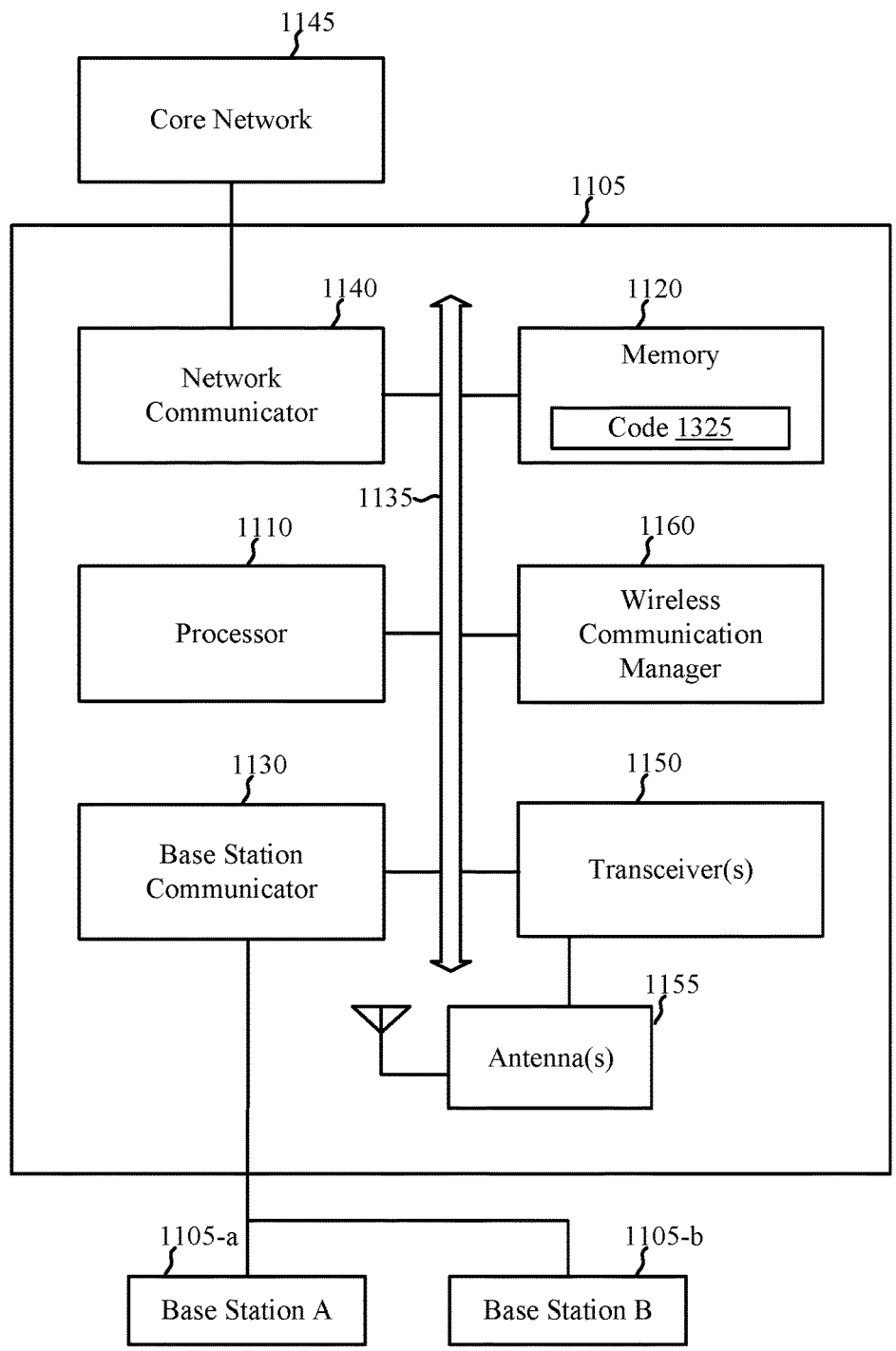
FIG. 11 shows a block diagram of a base station for use in wireless communication, in accordance with various aspects of the present disclosure.

FIG. 11 shows a block diagram 1100 of a base station 1105 for use in wireless communication, in accordance with various aspects of the present disclosure. In some examples, the base station 1105 may be an example of one or more aspects of the base stations described with reference to FIGS. 1, 2, and 5. The base station 1105 may be configured to implement or facilitate at least some of the base station or apparatus techniques or functions described with reference to FIGS. 1-5.

The base station 1105 may include a processor 1110, a memory 1120, at least one transceiver (represented by transceiver(s) 1150), at least one antenna 1155 (e.g., an antenna array), or a wireless communication manager 1160. The base station 1105 may also include one or more of a base station communicator 1130 or a network communicator 1140. Each of these components may be in communication with each other, directly or indirectly, over one or more buses 1135.

The memory 1120 may include RAM or ROM. The memory 1120 may store computer-readable, computer-executable code 1125 containing instructions that are configured to, when executed, cause the processor 1110 to perform various functions described herein related to wireless communication, including, for example, indicating a time window for a UE to perform antenna sub-array selection refinement or receiving a scheduling request state indicating an antenna sub-array selected by a UE. Alternatively, the computer-executable code 1125 may not be directly executable by the processor 1110 but be configured to cause the base station 1105 (e.g., when compiled and executed) to perform various of the functions described herein.

The processor 1110 may include an intelligent hardware device, e.g., a CPU, a microcontroller, an ASIC, etc. The processor 1110 may process information received through the transceiver(s) 1150, the base station communicator 1130, or the network communicator 1140. The processor 1110 may also process information to be sent to the transceiver(s) 1150 for transmission through the antennas 1155, or to the base station communicator 1130 for transmission to one or more other base stations (e.g., base station 1105-*a* and base station 1105-*b*), or to the network communicator 1140 for transmission to a core network 1145, which may be an example of one or more aspects of the core network 130 described with reference to FIG. 1. The processor 1110 may handle, alone or in connection with the wireless communication manager 1160, one or more aspects of communicating over (or managing communications over) one or more radio frequency spectrum bands.

The transceiver(s) 1150 may include a modem configured to modulate packets and provide the modulated packets to the antennas 1155 for transmission, and to demodulate packets received from the antennas 1155. The transceiver(s) 1150 may, in some examples, be implemented as one or more transmitters and one or more separate receivers. The transceiver(s) 1150 may support communications in one or more radio frequency spectrum bands. The transceiver(s) 1150 may be configured to communicate bi-directionally, via the antennas 1155, with one or more UEs or apparatuses, such as one or more of the UEs or apparatus described with reference to FIG. 1, 2, 3, 4, 5, 6, 8, 9, or 10. The base station 1105 may communicate with the core network 1145 through the network communicator 1140. The base station 1105 may also communicate with other base stations, such as the base station 1105-*a* and the base station 1105-*b*, using the base station communicator 1130.

The wireless communication manager 1160 may be configured to perform or control some or all of the base station or apparatus techniques or functions described with reference to FIGS. 1-5. The wireless communication manager 1160, or portions of it, may include a processor, or some or all of the functions of the wireless communication manager 1160 may be performed by the processor 1110 or in connection with the processor 1110.

Figure 12:
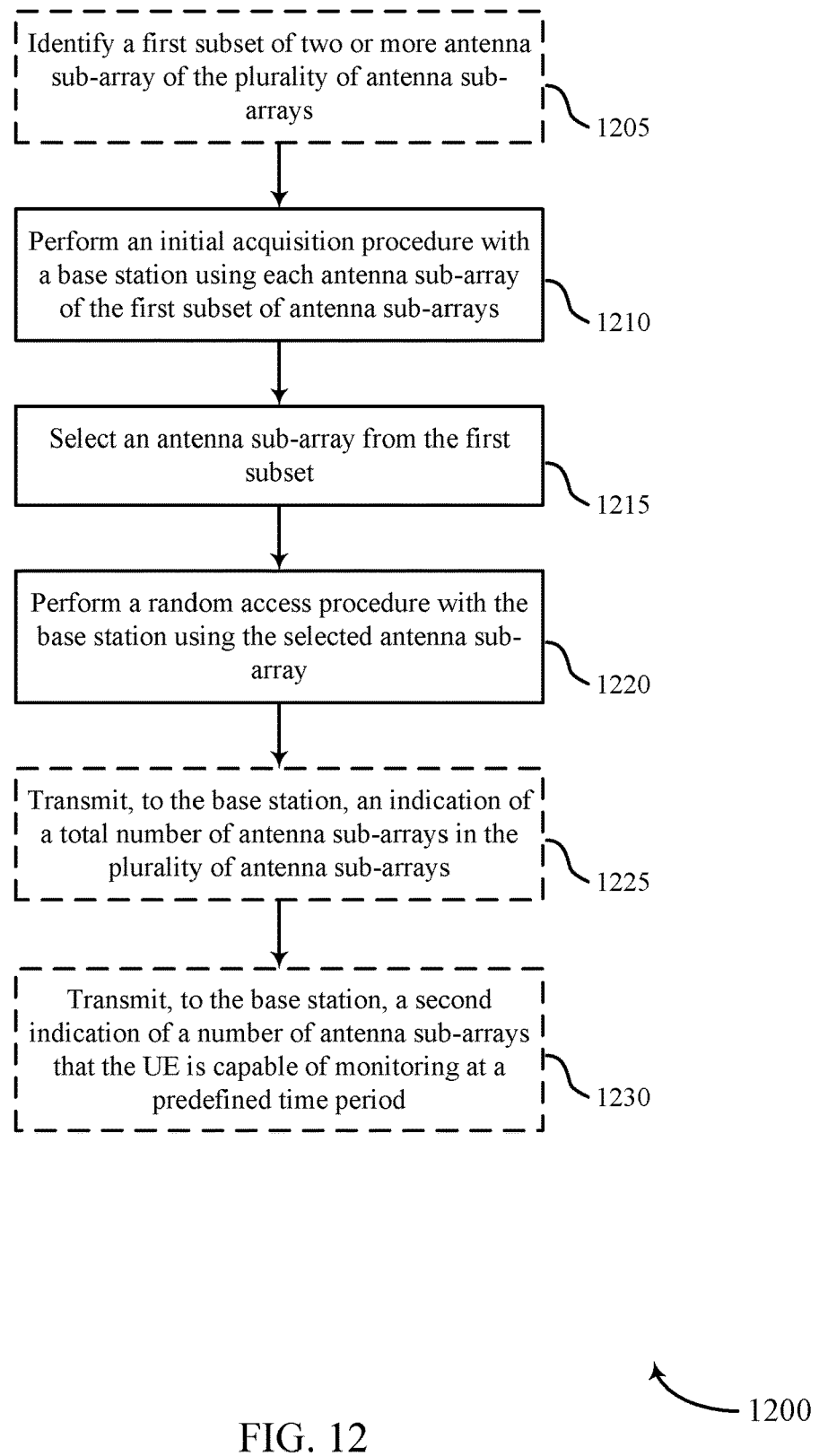
FIGS. 12-17 are flow charts illustrating examples of methods for wireless communication at a UE having a plurality of antennas, in accordance with various aspects of the present disclosure.

FIG. 12 is a flow chart illustrating an example of a method 1200 for wireless communication at a UE having a plurality of antennas, in accordance with various aspects of the present disclosure. For clarity, the method 1200 is described below with reference to aspects of one or more of the UEs described with reference to FIGS. 1-5 and 9, aspects of the apparatus described with reference to FIG. 6, or aspects of one or more of the wireless communication managers described with reference to FIGS. 6, 7, and 10. In some examples, a UE may execute one or more sets of codes to control the functional elements of the UE to perform the functions described below. Additionally or alternatively, the UE may perform one or more of the functions described below using special-purpose hardware.

At block 1205, the method 1200 may optionally include identifying a first subset of two or more antenna sub-array of the plurality of antenna sub-arrays, as described for example with reference to FIG. 4 or 5. In some examples, the first subset may be identified based at least in part on a number of RF chains of the UE, a connectivity of the RF chains to the plurality of antenna sub-arrays, a power setting of the UE, a total number of antenna sub-arrays in the plurality of antenna sub-arrays, a preconfigured minimum number of antenna sub-arrays, or a combination thereof. In some examples, the operation(s) at block 1205 may be performed using the antenna subset identifier described with reference to FIG. 7.

At block 1210, the method 1200 may include performing an initial acquisition procedure with a base station using each antenna sub-array of the first subset of two or more antenna sub-arrays, as described for example with reference to FIG. 4 or 5. In some examples, the operation(s) at block 1210 may be performed using the initial acquisition manager described with reference to FIG. 6 or 7.

At block 1215, the method 1200 may include selecting an antenna sub-array from the first subset of two or more antenna sub-arrays, as described for example with reference to FIG. 4 or 5. In some examples, the method 1200 may include measuring at least one signal received by each antenna sub-array of the first subset of two or more antenna sub-arrays while performing the initial acquisition procedure with the base station, and selecting the antenna sub-array used to perform the random access procedure based at least in part on the signal measurements. In some examples, the signal measurements may include signal strength measurements, and the selected antenna sub-array may be associated with a strongest signal strength measurement of the signal strength measurements. In some examples, the operation(s) at block 1215 may be performed using the antenna sub-array selector described with reference to FIG. 6 or 7, or the signal measurement manager described with reference to FIG. 7.

At block 1220, the method 1200 may include performing a random access procedure with the base station using the selected antenna sub-array, as described for example with reference to FIG. 4 or 5. In some examples, the operation(s) at block 1220 may be performed using the random access manager described with reference to FIG. 6 or 7.

At block 1225, the method 1200 may optionally include transmitting, to the base station, an indication of a total number of antenna sub-arrays in the plurality of antenna sub-arrays, as described for example with reference to FIG. 4 or 5. In some examples, the indication of the total number of antenna sub-arrays in the plurality of antenna sub-arrays may be transmitted to the base station during the performance of the random access procedure or after the performance of the random access procedure. In some examples, the operation(s) at block 1225 may be performed using the capabilities indicator described with reference to FIG. 7.

At block 1230, the method 1200 may optionally include transmitting, to the base station, a second indication of a number of antenna sub-arrays that the UE is capable of monitoring at a predefined time period, as described for example with reference to FIG. 4 or 5. In some examples, the operation(s) at block 1230 may be performed using the capabilities indicator described with reference to FIG. 7.

Figure 13:
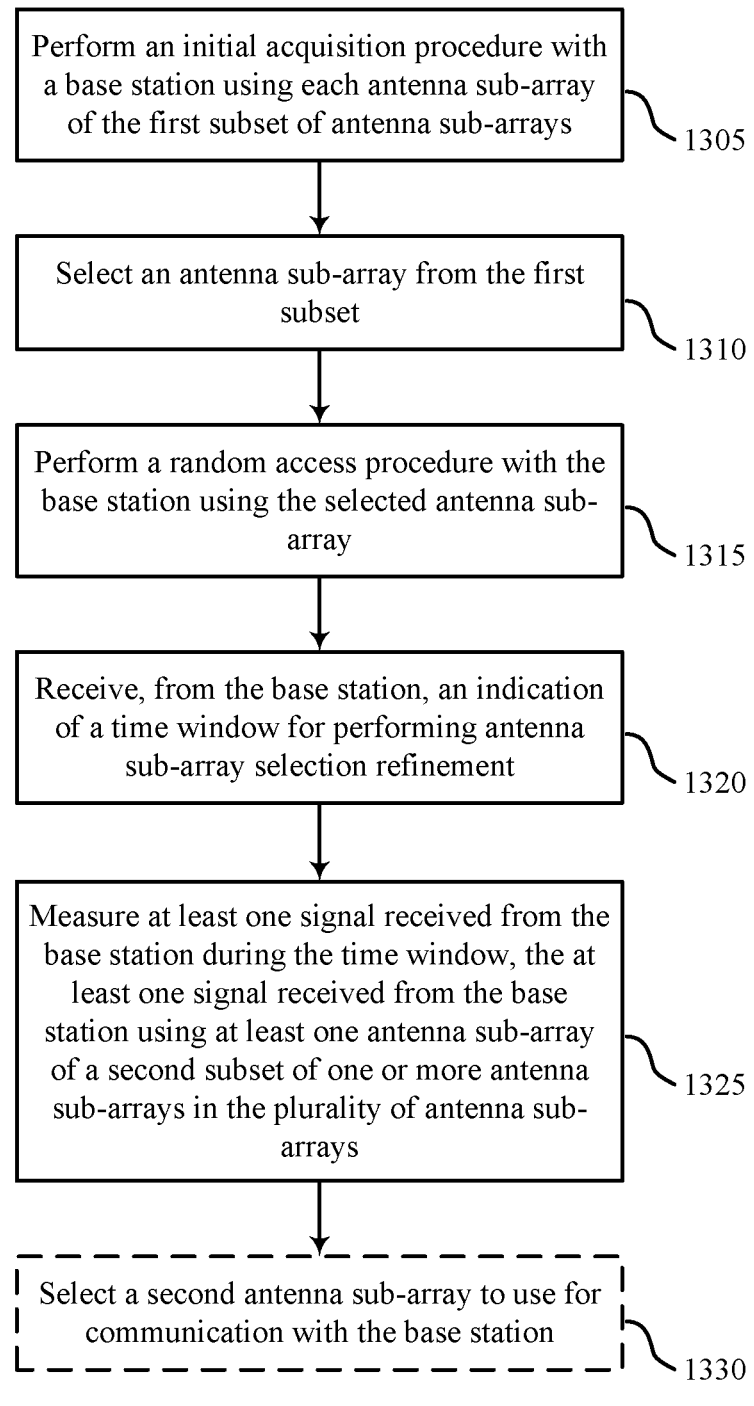

FIG. 13 is a flow chart illustrating an example of a method 1300 for wireless communication at a UE having a plurality of antennas, in accordance with various aspects of the present disclosure. For clarity, the method 1300 is described below with reference to aspects of one or more of the UEs described with reference to FIGS. 1-5 and 10, aspects of the apparatus described with reference to FIG. 6, or aspects of one or more of the wireless communication managers described with reference to FIGS. 6, 7, and 10. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include performing an initial acquisition procedure with a base station using each antenna sub-array of a first subset of antenna sub-arrays, as described for example with reference to FIG. 4 or 5. The first subset may include two or more antenna sub-arrays of the plurality of antenna sub-arrays. In some examples, the operation(s) at block 1305 may be performed using the initial acquisition manager described with reference to FIG. 6 or 7.

At block 1310, the method 1300 may include selecting an antenna sub-array from the first subset of two or more antenna sub-arrays, as described for example with reference to FIG. 4 or 5. In some examples, the operation(s) at block 1310 may be performed using the antenna sub-array selector described with reference to FIG. 6 or 7.

At block 1315, the method 1300 may include performing a random access procedure with the base station using the selected antenna sub-array, as described for example with reference to FIG. 4 or 5. In some examples, the operation(s) at block 1315 may be performed using the random access manager described with reference to FIG. 6 or 7.

At block 1320, the method 1300 may include receiving, from the base station, an indication of a time window for performing antenna sub-array selection refinement, as described for example with reference to FIG. 4 or 5. In some examples, the time window may be associated with at least one of no UE-specific traffic for the UE, no or reduced broadcast traffic for the UE, UE-specific measurement signals received from the base station, broadcast measurement signals received from the base station, or a combination thereof. In some examples, the indication of the time window may be received in RRC signaling. In some examples, the operation(s) at block 1320 may be performed using the antenna sub-array selection refinement manager described with reference to FIG. 7.

At block 1325, the method 1300 may include measuring at least one signal received from the base station during the time window, as described for example with reference to FIG. 4 or 5. In some examples, the at least one signal may be received from the base station using at least one antenna sub-array of a second subset of one or more antenna sub-arrays in the plurality of antenna sub-arrays, with the second subset being disjoint from the first subset. In some examples, the operation(s) at block 1325 may be performed using the signal measurement manager described with reference to FIG. 7.

At block 1330, the method 1300 may optionally include selecting a second antenna sub-array to use for communication with the base station, as described for example with reference to FIG. 4 or 5. In some examples, the second antenna sub-array may be selected from the second subset based at least in part on the measurement of the at least one signal. In some examples, the second antenna sub-array may be selected based at least in part on a measurement of at least one signal received by the second antenna sub-array satisfying a first threshold, a measurement of at least one signal received by the antenna sub-array used to perform the random access procedure satisfying a second threshold, or a combination thereof. In some examples, at least one of the first threshold or the second threshold may be preconfigured at the UE, determined based at least in part on a parameter of the UE, received from the base station, or a combination thereof. In some examples, at least one of the first threshold or the second threshold may include an absolute threshold or a relative improvement threshold. In some examples, the operation(s) at block 1330 may be performed using the antenna sub-array selector described with reference to FIG. 6 or 7.

Figure 14:
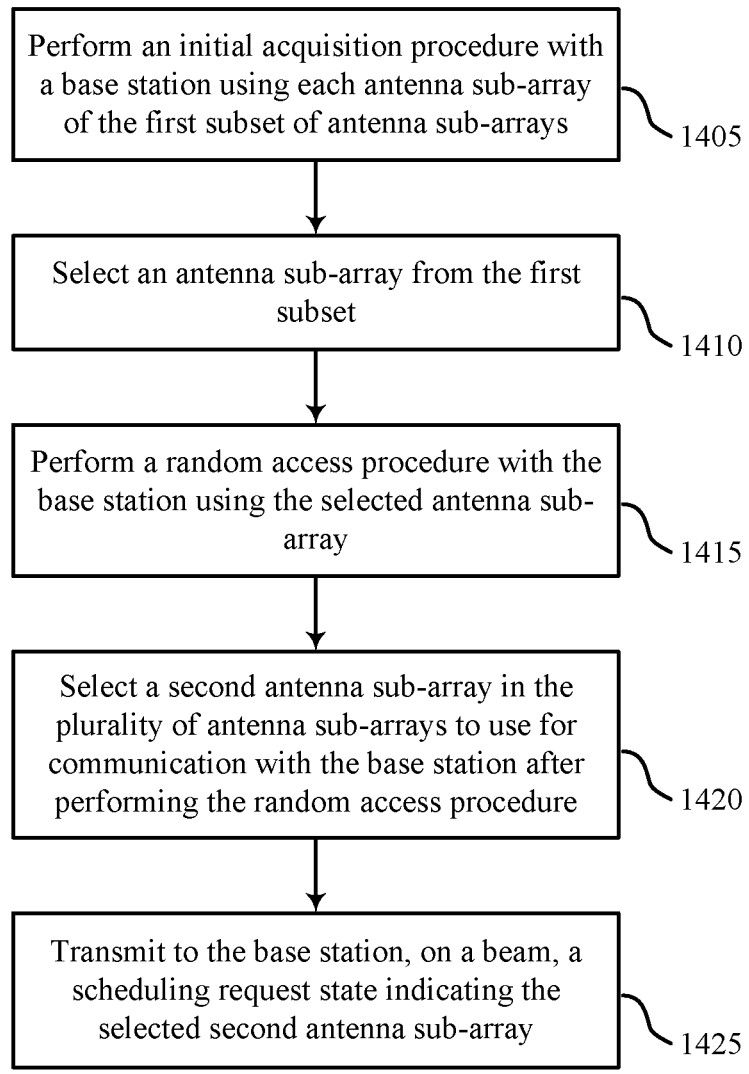

FIG. 14 is a flow chart illustrating an example of a method 1400 for wireless communication at a UE having a plurality of antennas, in accordance with various aspects of the present disclosure. For clarity, the method 1400 is described below with reference to aspects of one or more of the UEs described with reference to FIGS. 1-5 and 10, aspects of the apparatus described with reference to FIG. 6, or aspects of one or more of the wireless communication managers described with reference to FIGS. 6, 7, and 10. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include performing an initial acquisition procedure with a base station using each antenna sub-array of a first subset of antenna sub-arrays, as described for example with reference to FIG. 4 or 5. The first subset may include two or more antenna sub-arrays of the plurality of antenna sub-arrays. In some examples, the operation(s) at block 1405 may be performed using the initial acquisition manager described with reference to FIG. 6 or 7.

At block 1410, the method 1400 may include selecting an antenna sub-array from the first subset of two or more antenna sub-arrays, as described for example with reference to FIG. 4 or 5. In some examples, the operation(s) at block 1410 may be performed using the antenna sub-array selector described with reference to FIG. 6 or 7.

At block 1415, the method 1400 may include performing a random access procedure with the base station using the selected antenna sub-array, as described for example with reference to FIG. 4 or 5. In some examples, the operation(s) at block 1415 may be performed using the random access manager described with reference to FIG. 6 or 7.

At block 1420, the method 1400 may include selecting a second antenna sub-array in the plurality of antenna sub-arrays to use for communication with the base station after performing the random access procedure, as described for example with reference to FIG. 4 or 5. In some examples, the operation(s) at block 1420 may be performed using the antenna sub-array selector described with reference to FIG. 6 or 7.

At block 1425, the method 1400 may include transmitting to the base station, on a beam, a scheduling request state indicating the selected second antenna sub-array, as described for example with reference to FIG. 4 or 5. In some examples, the at least one signal may be received from the base station using at least one antenna sub-array of a second subset of one or more antenna sub-arrays in the plurality of antenna sub-arrays, with the second subset being disjoint from the first subset. In some examples, the operation(s) at block 1425 may be performed using the scheduling request manager described with reference to FIG. 7.

Figure 15:
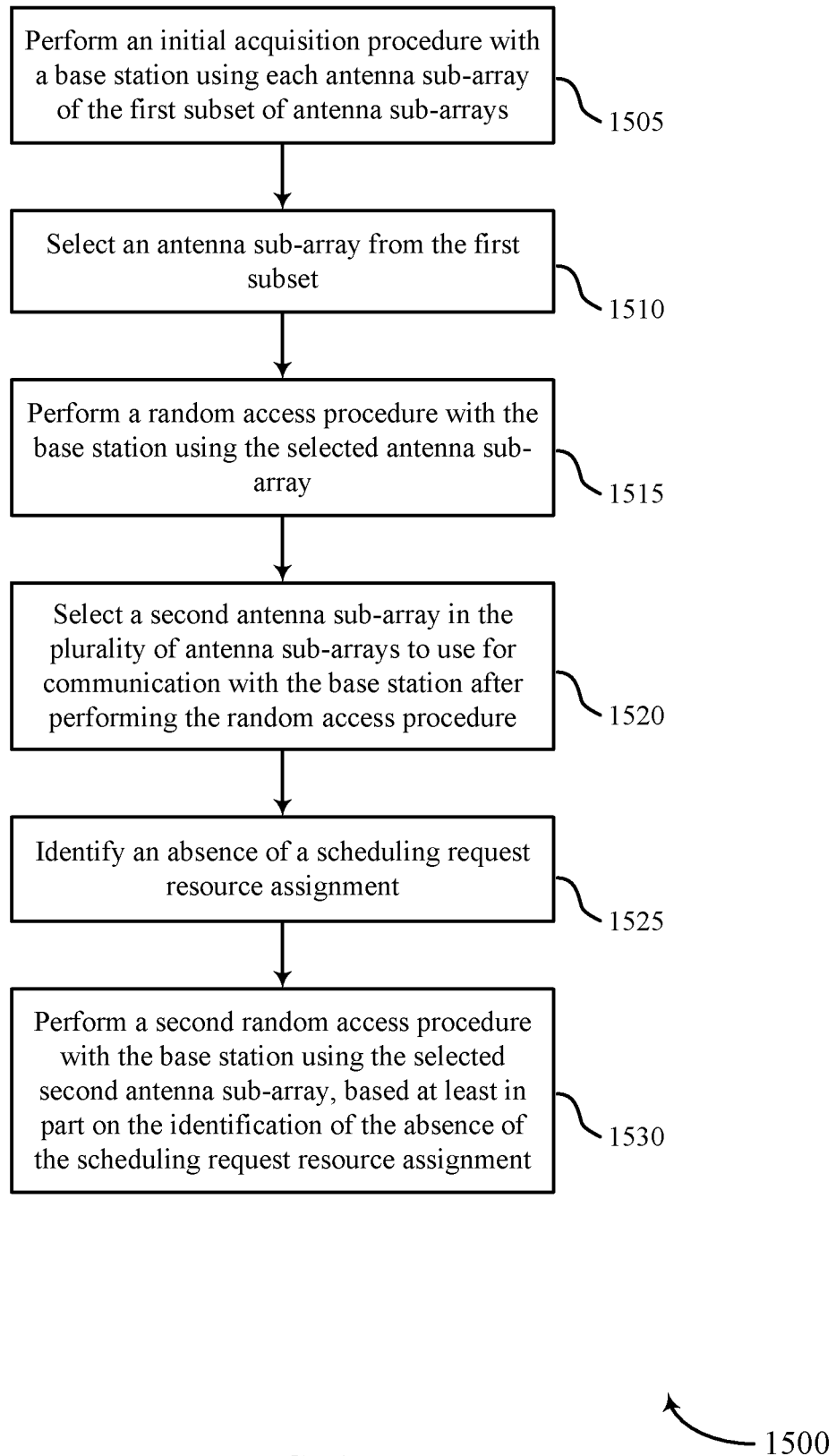

FIG. 15 is a flow chart illustrating an example of a method 1500 for wireless communication at a UE having a plurality of antennas, in accordance with various aspects of the present disclosure. For clarity, the method 1500 is described below with reference to aspects of one or more of the UEs described with reference to FIGS. 1-5 and 10, aspects of the apparatus described with reference to FIG. 6, or aspects of one or more of the wireless communication managers described with reference to FIGS. 6, 7, and 10. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include performing an initial acquisition procedure with a base station using each antenna sub-array of a first subset of antenna sub-arrays, as described for example with reference to FIG. 4 or 5. The first subset may include two or more antenna sub-arrays of the plurality of antenna sub-arrays. In some examples, the operation(s) at block 1505 may be performed using the initial acquisition manager described with reference to FIG. 6 or 7.

At block 1510, the method 1500 may include selecting an antenna sub-array from the first subset of two or more antenna sub-arrays, as described for example with reference to FIG. 4 or 5. In some examples, the operation(s) at block 1510 may be performed using the antenna sub-array selector described with reference to FIG. 6 or 7.

At block 1515, the method 1500 may include performing a random access procedure with the base station using the selected antenna sub-array, as described for example with reference to FIG. 4 or 5. In some examples, the operation(s) at block 1515 may be performed using the random access manager described with reference to FIG. 6 or 7.

At block 1520, the method 1500 may include selecting a second antenna sub-array in the plurality of antenna sub-arrays to use for communication with the base station after performing the random access procedure, as described for example with reference to FIG. 4 or 5. In some examples, the operation(s) at block 1520 may be performed using the antenna sub-array selector described with reference to FIG. 6 or 7.

At block 1525, the method 1500 may include identifying an absence of a scheduling request resource assignment, as described for example with reference to FIG. 4 or 5. In some examples, the operation(s) at block 1525 may be performed using the scheduling request manager described with reference to FIG. 7.

At block 1530, the method 1500 may include performing a second random access procedure with the base station using the selected second antenna sub-array, based at least in part on the identification of the absence of the scheduling request resource assignment, as described for example with reference to FIG. 4 or 5. In some examples, the operation(s) at block 1530 may be performed using the random access manager described with reference to FIG. 7.

Figure 16:
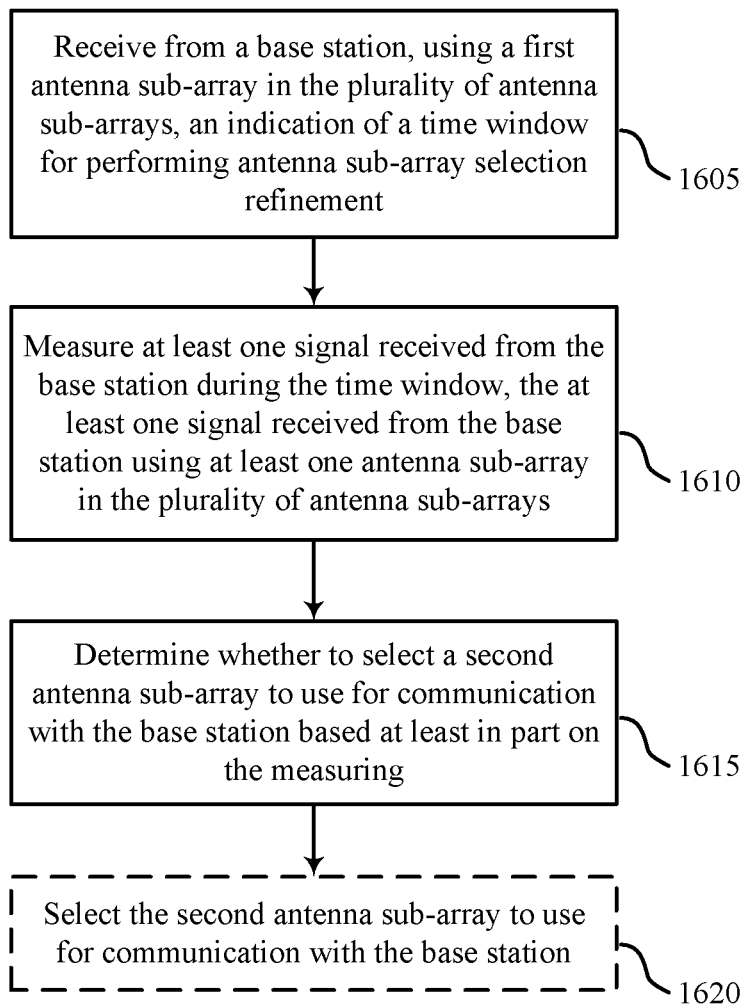

FIG. 16 is a flow chart illustrating an example of a method 1600 for wireless communication at a UE having a plurality of antennas, in accordance with various aspects of the present disclosure. For clarity, the method 1600 is described below with reference to aspects of one or more of the UEs described with reference to FIGS. 1-5 and 10, aspects of the apparatus described with reference to FIG. 8, or aspects of one or more of the wireless communication managers described with reference to FIGS. 8 and 10. In some examples, a UE may execute one or more sets of codes to control the functional elements of the UE to perform the functions described below. Additionally or alternatively, the UE may perform one or more of the functions described below using special-purpose hardware.

At block 1605, the method 1600 may include receiving from a base station, using a first antenna sub-array in the plurality of antenna sub-arrays, an indication of a time window for performing antenna sub-array selection refinement, as described for example with reference to FIG. 4 or 5. In some examples, the indication of the time window may be received before the UE performs an initial acquisition procedure with the base station using each antenna sub-array in the plurality of antenna sub-arrays. In some examples, the operation(s) at block 1605 may be performed using the antenna sub-array selection refinement manager described with reference to FIG. 8.

At block 1610, the method 1600 may include measuring at least one signal received from the base station during the time window, as described for example with reference to FIG. 4 or 5. The at least one signal may be received from the base station using at least one antenna sub-array in the plurality of antenna sub-arrays. In some examples, the operation(s) at block 1610 may be performed using the signal measurement manager described with reference to FIG. 8.

At block 1615, the method 1600 may include determining whether to select a second antenna sub-array to use for communication with the base station based at least in part on the measuring, as described for example with reference to FIG. 4 or 5. In some examples, the operation(s) at block 1615 may be performed using the antenna sub-array selector described with reference to FIG. 8.

At block 1620, the method 1600 may optionally include selecting the second antenna sub-array to use for communication with the base station, as described for example with reference to FIG. 4 or 5. In some examples, the operation(s) at block 1620 may be performed using the antenna sub-array selector described with reference to FIG. 8.

Figure 17:
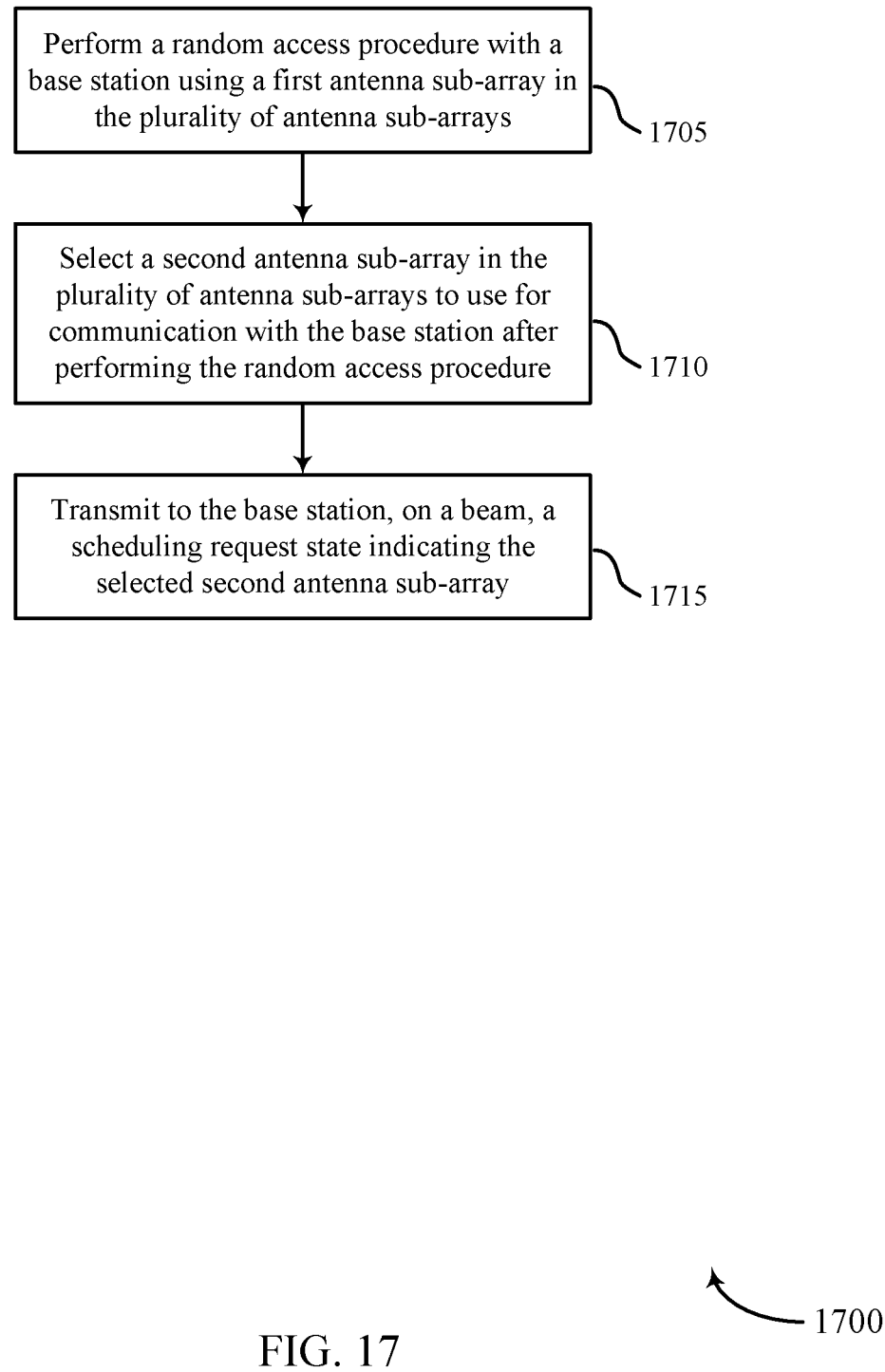

FIG. 17 is a flow chart illustrating an example of a method 1700 for wireless communication at a UE having a plurality of antennas, in accordance with various aspects of the present disclosure. For clarity, the method 1700 is described below with reference to aspects of one or more of the UEs described with reference to FIGS. 1-5 and 10, aspects of the apparatus described with reference to FIG. 9, or aspects of one or more of the wireless communication managers described with reference to FIGS. 9 and 10. In some examples, a UE may execute one or more sets of codes to control the functional elements of the UE to perform the functions described below. Additionally or alternatively, the UE may perform one or more of the functions described below using special-purpose hardware.

At block 1705, the method 1700 may include performing a random access procedure with a base station using a first antenna sub-array in the plurality of antenna sub-arrays, as described for example with reference to FIG. 4 or 5. In some examples, the operation(s) at block 1705 may be performed using the random access manager described with reference to FIG. 9.

At block 1710, the method 1700 may include selecting a second antenna sub-array in the plurality of antenna sub-arrays to use for communication with the base station after performing the random access procedure, as described for example with reference to FIG. 4 or 5. The at least one signal may be received from the base station using at least one antenna sub-array in the plurality of antenna sub-arrays. In some examples, the operation(s) at block 1710 may be performed using the antenna sub-array selector described with reference to FIG. 9.

At block 1715, the method 1700 may include transmitting to the base station, on a beam, a scheduling request state indicating the selected second antenna sub-array, as described for example with reference to FIG. 4 or 5. In some examples, the operation(s) at block 1715 may be performed using the scheduling request manager described with reference to FIG. 9.

The methods 1200, 1300, 1400, 1500, 1600, and 1700 described with reference to FIGS. 12-17 may provide for wireless communication. It should be noted that the methods are example implementations of some of the techniques described in the present disclosure, and the operations of the methods may be rearranged, combined with other operations of the same or different method, or otherwise modified, such that other implementations are possible. In some examples, operations of the methods 1200, 1300, 1400, 1500, 1600, or 1700 may be combined. In some examples, operations may be added to the methods.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE) having a plurality of antenna sub-arrays wherein each antenna sub-array comprises a separate panel of antenna elements, comprising:
   identifying a first subset of antenna subarrays based at least in part on: a number of radio frequency (RF) chains of the UE, a connectivity of the RF chains to the plurality of antenna sub-arrays, a power setting of the UE, a total number of antenna sub-arrays in the plurality of antenna sub-arrays, a preconfigured minimum number of antenna sub-arrays, or a combination thereof;
   performing an initial acquisition procedure with a base station using each antenna sub-array of the first subset of antenna sub-arrays, the first subset comprising two or more antenna sub-arrays of the plurality of antenna sub-arrays;
   selecting an antenna sub-array from the first subset; and
   performing a random access procedure with the base station using the selected antenna sub-array.

2. A method for wireless communication at a user equipment (UE) having a plurality of antenna sub-arrays wherein each antenna sub-array comprises a separate panel of antenna elements, comprising:
   performing an initial acquisition procedure with a base station using each antenna sub-array of a first subset of antenna sub-arrays, the first subset comprising two or more antenna sub-arrays of the plurality of antenna sub-arrays;
   selecting an antenna sub-array from the first subset;
   performing a random access procedure with the base station using the selected antenna sub-array;
   receiving, from the base station, an indication of a time window for performing antenna sub-array selection refinement; and
   measuring at least one signal received from the base station during the time window, the at least one signal received from the base station using at least one antenna sub-array of a second subset of one or more antenna sub-arrays in the plurality of antenna sub-arrays, the second subset being disjoint from the first subset.

3. The method of claim 2, further comprising:
   selecting a second antenna sub-array to use for communication with the base station, the second antenna sub-array selected from the second subset based at least in part on the measurement of the at least one signal.

4. The method of claim 3, wherein the second antenna sub-array is selected based at least in part on: a measurement of at least one signal received by the second antenna sub-array satisfying a first threshold, a measurement of at least one signal received by the antenna sub-array used to perform the random access procedure satisfying a second threshold, or a combination thereof.

5. The method of claim 4, wherein at least one of the first threshold or the second threshold is preconfigured at the UE, determined based at least in part on a parameter of the UE, received from the base station, or a combination thereof.

6. The method of claim 4, wherein at least one of the first threshold or the second threshold comprises an absolute threshold or a relative improvement threshold.

7. The method of claim 2, wherein the time window is associated with at least one of: no UE-specific traffic for the UE, no or reduced broadcast traffic for the UE, UE-specific measurement signals received from the base station, broadcast measurement signals received from the base station, or a combination thereof.

8. The method of claim 2, wherein the indication of the time window is received in radio resource control (RRC) signaling.

9. A method for wireless communication at a user equipment (UE) having a plurality of antenna sub-arrays wherein each antenna sub-array comprises a separate panel of antenna elements, comprising:
   performing an initial acquisition procedure with a base station using each antenna sub-array of a first subset of antenna sub-arrays, the first subset comprising two or more antenna sub-arrays of the plurality of antenna sub-arrays;
   selecting an antenna sub-array from the first subset performing a random access procedure with the base station using the selected antenna sub-array;
   selecting a second antenna sub-array in the plurality of antenna sub-arrays to use for communication with the base station after performing the random access procedure; and
   transmitting to the base station, on a beam, a scheduling request state indicating the selected second antenna sub-array.

10. A method for wireless communication at a user equipment (UE) having a plurality of antenna sub-arrays wherein each antenna sub-array comprises a separate panel of antenna elements, comprising:
   performing an initial acquisition procedure with a base station using each antenna sub-array of a first subset of antenna sub-arrays, the first subset comprising two or more antenna sub-arrays of the plurality of antenna sub-arrays;
   selecting an antenna sub-array from the first subset;
   performing a random access procedure with the base station using the selected antenna sub-array;
   selecting a second antenna sub-array in the plurality of antenna sub-arrays to use for communication with the base station after performing the random access procedure;
   identifying an absence of a scheduling request resource assignment; and
   performing a second random access procedure with the base station using the selected second antenna sub-array, based at least in part on the identification of the absence of the scheduling request resource assignment.

11. A method for wireless communication at a user equipment (UE) having a plurality of antenna sub-arrays wherein each antenna sub-array comprises a separate panel of antenna elements, comprising:
   performing an initial acquisition procedure with a base station using each antenna sub-array of a first subset of antenna sub-arrays, the first subset comprising two or more antenna sub-arrays of the plurality of antenna sub-arrays;

selecting an antenna sub-array from the first subset;

performing a random access procedure with the base station using the selected antenna sub-array;

measuring at least one signal received by each antenna sub-array of the first subset of two or more antenna sub-arrays while performing the initial acquisition procedure with the base station; and selecting the antenna sub-array used to perform the random access procedure based at least in part on the signal measurements.

12. The method of claim 11, wherein the signal measurements comprise signal strength measurements, and the selected antenna sub-array is associated with a strongest signal strength measurement of the signal strength measurements.

13. An apparatus for wireless communication at a user equipment (UE) having a plurality of antenna sub-arrays wherein each antenna sub-array comprises a separate panel of antenna elements, comprising:

a processor;

memory in electronic communication with the processor; and instructions stored in the memory, the instructions being executable by the processor to:

perform an initial acquisition procedure with a base station using each antenna sub-array of a first subset of antenna sub-arrays, the first subset comprising two or more antenna sub-arrays of the plurality of antenna sub-arrays;

select an antenna sub-array from the first subset;

perform a random access procedure with the base station using the selected antenna sub-array; and identify the first subset based at least in part on: a number of radio frequency (RF) chains of the UE, a connectivity of the RF chains to the plurality of antenna sub-arrays, a power setting of the UE, a total number of antenna sub-arrays in the plurality of antenna sub-arrays, a preconfigured minimum number of antenna sub-arrays, or a combination thereof.

14. An apparatus for wireless communication at a user equipment (UE) having a plurality of antenna sub-arrays wherein each antenna sub-array comprises a separate panel of antenna elements, comprising:

a processor;

memory in electronic communication with the processor; and instructions stored in the memory, the instructions being executable by the processor to:

perform an initial acquisition procedure with a base station using each antenna sub-array of a first subset of antenna sub-arrays, the first subset comprising two or more antenna sub-arrays of the plurality of antenna sub-arrays;

select an antenna sub-array from the first subset;

perform a random access procedure with the base station using the selected antenna sub-array;

receive, from the base station, an indication of a time window for performing antenna sub-array selection refinement; and measure at least one signal received from the base station during the time window, the at least one signal received from the base station using at least one antenna sub-array of a second subset of one or more antenna sub-arrays in the plurality of antenna sub-arrays, the second subset being disjoint from the first subset.

15. The apparatus of claim 14, wherein the instructions are executable by the processor to:

select a second antenna sub-array to use for communication with the base station, the second antenna sub-array selected from the second subset based at least in part on the measurement of the at least one signal.

16. The apparatus of claim 15, wherein the second antenna sub-array is selected based at least in part on: a measurement of at least one signal received by the second antenna sub-array satisfying a first threshold, a measurement of at least one signal received by the antenna sub-array used to perform the random access procedure satisfying a second threshold, or a combination thereof.

17. The apparatus of claim 16, wherein at least one of the first threshold or the second threshold is preconfigured at the UE, determined based at least in part on a parameter of the UE, received from the base station, or a combination thereof.

18. The apparatus of claim 16, wherein at least one of the first threshold or the second threshold comprises an absolute threshold or a relative improvement threshold.

19. The apparatus of claim 14, wherein the time window is associated with at least one of: no UE-specific traffic for the UE, no or reduced broadcast traffic for the UE, UE-specific measurement signals received from the base station, broadcast measurement signals received from the base station, or a combination thereof.

20. The apparatus of claim 14, wherein the indication of the time window is received in radio resource control (RRC) signaling.

21. An apparatus for wireless communication at a user equipment (UE) having a plurality of antenna sub-arrays wherein each antenna sub-array comprises a separate panel of antenna elements, comprising:

a processor;

memory in electronic communication with the processor; and instructions stored in the memory, the instructions being executable by the processor to:

perform an initial acquisition procedure with a base station using each antenna sub-array of a first subset of antenna sub-arrays, the first subset comprising two or more antenna sub-arrays of the plurality of antenna sub-arrays;

select an antenna sub-array from the first subset;

perform a random access procedure with the base station using the selected antenna sub-array;

select a second antenna sub-array in the plurality of antenna sub-arrays to use for communication with the base station after performing the random access procedure; and transmit to the base station, on a beam, a scheduling request state indicating the selected second antenna sub-array.

22. An apparatus for wireless communication at a user equipment (UE) having a plurality of antenna sub-arrays wherein each antenna sub-array comprises a separate panel of antenna elements, comprising:

a processor;

memory in electronic communication with the processor; and instructions stored in the memory, the instructions being executable by the processor to:

perform an initial acquisition procedure with a base station using each antenna sub-array of a first subset of antenna sub-arrays, the first subset comprising two or more antenna sub-arrays of the plurality of antenna sub-arrays;

select an antenna sub-array from the first subset;

perform a random access procedure with the base station using the selected antenna sub-array;

select a second antenna sub-array in the plurality of antenna sub-arrays to use for communication with the base station after performing the random access procedure;

identify an absence of a scheduling request resource assignment; and perform a second random access procedure with the base station using the selected second antenna sub-array, based at least in part on the identification of the absence of the scheduling request resource assignment.

23. An apparatus for wireless communication at a user equipment (UE) having a plurality of antenna sub-arrays wherein each antenna sub-array comprises a separate panel of antenna elements, comprising:

a processor;

memory in electronic communication with the processor; and instructions stored in the memory, the instructions being executable by the processor to:

perform an initial acquisition procedure with a base station using each antenna sub-array of a first subset of antenna sub-arrays, the first subset comprising two or more antenna sub-arrays of the plurality of antenna sub-arrays;

select an antenna sub-array from the first subset;

perform a random access procedure with the base station using the selected antenna sub-array;

measure at least one signal received by each antenna sub-array of the first subset of two or more antenna sub-arrays while performing the initial acquisition procedure with the base station; and select the antenna sub-array used to perform the random access procedure based at least in part on the signal measurements.

24. The apparatus of claim 23, wherein the signal measurements comprise signal strength measurements, and the selected antenna sub-array is associated with a strongest signal strength measurement of the signal strength measurements.

* * * * *